United States Patent
Yang et al.

(10) Patent No.: US 11,909,689 B2
(45) Date of Patent: *Feb. 20, 2024

(54) METHOD AND APPARATUS FOR TRANSMITTING AND RECEIVING RADIO SIGNALS IN A WIRELESS COMMUNICATION SYSTEM

(71) Applicant: LG Electronics Inc., Seoul (KR)

(72) Inventors: Suckchel Yang, Seoul (KR); Kijun Kim, Seoul (KR); Seonwook Kim, Seoul (KR); Changhwan Park, Seoul (KR); Joonkui Ahn, Seoul (KR); Hanjun Park, Seoul (KR); Seunggye Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/944,442

(22) Filed: Jul. 31, 2020

(65) Prior Publication Data

US 2020/0366444 A1    Nov. 19, 2020

Related U.S. Application Data

(63) Continuation of application No. 15/930,694, filed on May 13, 2020, now Pat. No. 11,038,655, which is a
(Continued)

(30) Foreign Application Priority Data

Mar. 8, 2018    (KR) .................. 10-2018-0027207

(51) Int. Cl.
*H04L 5/00*    (2006.01)
*H04W 76/27*    (2018.01)
(Continued)

(52) U.S. Cl.
CPC .......... *H04L 5/0055* (2013.01); *H04L 1/0061* (2013.01); *H04L 1/1614* (2013.01);
(Continued)

(58) Field of Classification Search
CPC ......... H04L 5/0055; H04L 5/00; H04L 5/001; H04L 1/0061; H04L 1/1614; H04L 1/1819; H04L 1/1854; H04W 76/27
(Continued)

(56) References Cited

U.S. PATENT DOCUMENTS 9,032,267 B2    5/2015   Shimanuki et al.
10,644,840 B2*  5/2020   Liao ............... H04L 1/1845
(Continued)

FOREIGN PATENT DOCUMENTS

CN    1675874    9/2005
CN    1983913    6/2007
(Continued)

OTHER PUBLICATIONS

3GPP TSG RAN WG1 Meeting #88 R1-1702745, Athens, Green Feb. 13-17, 2017, Source: MediaTek Inc.*
(Continued)

*Primary Examiner* — Faisal Choudhury
(74) *Attorney, Agent, or Firm* — Fish & Richardson P.C.

(57) ABSTRACT

The present invention relates to a wireless communication system, and more particularly, to a method and apparatus for receiving information on a number N of a code block group defined for one transport block from a base station through an upper layer signal, receiving a first transport block including a plurality of code blocks from the base station through a physical layer channel, and transmitting HARQ-ACK payload including HARQ-ACK information on the first transport block to the base station. Preferably, a code block-based CRC is attached to each of the code blocks, a
(Continued)

transport block-based CRC is attached to the first transport block, and the HARQ-ACK payload includes a plurality of HARQ-ACK bits corresponding to M code block groups for the first transport block.

17 Claims, 14 Drawing Sheets

Related U.S. Application Data continuation of application No. 16/262,373, filed on Jan. 30, 2019, now Pat. No. 10,721,046, which is a continuation of application No. PCT/KR2018/002743, filed on Mar. 8, 2018.

(60) Provisional application No. 62/566,339, filed on Sep. 30, 2017, provisional application No. 62/520,562, filed on Jun. 16, 2017, provisional application No. 62/501,048, filed on May 3, 2017, provisional application No. 62/475,860, filed on Mar. 23, 2017, provisional application No. 62/469,546, filed on Mar. 10, 2017, provisional application No. 62/468,380, filed on Mar. 8, 2017.

(51) Int. Cl.
*H04L 1/1607* (2023.01)
*H04L 1/1829* (2023.01)
*H04L 1/00* (2006.01)
*H04L 1/1812* (2023.01)

(52) U.S. Cl.
CPC .......... *H04L 1/1819* (2013.01); *H04L 1/1854* (2013.01); *H04L 5/00* (2013.01); *H04L 5/001* (2013.01); *H04W 76/27* (2018.02)

(58) Field of Classification Search
USPC .......................................................... 370/330
See application file for complete search history.

(56) References Cited

U.S. PATENT DOCUMENTS

| | | | |
|---|---|---|---|
| 10,721,046 B2 | 7/2020 | Yang et al. | |
| 10,784,987 B2 | 9/2020 | Marinier et al. | |
| 10,972,227 B2 | 4/2021 | Lin | |
| 11,012,221 B2 | 5/2021 | Yang et al. | |
| 11,012,223 B2 | 5/2021 | Yang et al. | |
| 11,038,655 B2 | 6/2021 | Yang et al. | |
| 11,129,175 B2* | 9/2021 | Yun .................... | H04W 72/1215 |
| 11,750,220 B2 | 9/2023 | Myung et al. | |
| 2009/0313516 A1 | 12/2009 | Shin et al. | |
| 2011/0004799 A1 | 1/2011 | Shimanuki et al. | |
| 2011/0199961 A1 | 8/2011 | Narasimha et al. | |
| 2012/0002657 A1 | 1/2012 | Seyama et al. | |
| 2016/0028505 A1 | 1/2016 | Pi et al. | |
| 2016/0036578 A1 | 2/2016 | Malladi et al. | |
| 2016/0226643 A1 | 8/2016 | Mallik et al. | |
| 2016/0233999 A1 | 8/2016 | Kannan et al. | |
| 2016/0329995 A1 | 11/2016 | Jiang et al. | |
| 2017/0026297 A1 | 1/2017 | Sun et al. | |
| 2018/0109355 A1 | 4/2018 | Werner et al. | |
| 2018/0145703 A1 | 5/2018 | Li et al. | |
| 2018/0167171 A1* | 6/2018 | Wu ....................... | H04L 1/1816 |
| 2018/0167932 A1 | 6/2018 | Papasakellariou | |
| 2018/0234155 A1 | 8/2018 | Neuhaus et al. | |
| 2018/0234881 A1 | 8/2018 | Hosseini et al. | |
| 2018/0287745 A1 | 10/2018 | Sun et al. | |
| 2019/0020444 A1 | 1/2019 | Froberg et al. | |
| 2019/0123849 A1 | 4/2019 | Baldemair et al. | |
| 2019/0132089 A1 | 5/2019 | Hwang et al. | |
| 2019/0165893 A1 | 5/2019 | Khosravirad et al. | |
| 2019/0181986 A1 | 6/2019 | Kitamura et al. | |
| 2019/0191487 A1 | 6/2019 | Kwon et al. | |
| 2019/0230642 A1 | 7/2019 | Baldemair et al. | |
| 2019/0253204 A1 | 8/2019 | Takeda et al. | |
| 2019/0288797 A1 | 9/2019 | Guan et al. | |
| 2019/0334656 A1 | 10/2019 | Ma et al. | |
| 2019/0334664 A1* | 10/2019 | Guan .................... | H04L 1/1812 |
| 2019/0356422 A1 | 11/2019 | Shimomura | |
| 2019/0357205 A1 | 11/2019 | Li et al. | |
| 2019/0386781 A1 | 12/2019 | Lin | |
| 2020/0014491 A1 | 1/2020 | Takeda et al. | |
| 2020/0036482 A1 | 1/2020 | Park et al. | |
| 2020/0045725 A1 | 2/2020 | Mochizuki et al. | |
| 2020/0099474 A1 | 3/2020 | Wikstrom et al. | |
| 2020/0220657 A1 | 7/2020 | Zheng et al. | |
| 2020/0228257 A1* | 7/2020 | Baldemair ............ | H04L 1/1614 |
| 2020/0235874 A1 | 7/2020 | Yeo et al. | |
| 2020/0259596 A1 | 8/2020 | Noh et al. | |
| 2020/0295873 A1* | 9/2020 | Jayasinghe ........... | H04L 1/0009 |
| 2021/0100008 A1 | 4/2021 | Hong et al. | |
| 2021/0119738 A1 | 4/2021 | Yeo et al. | |
| 2021/0135791 A1 | 5/2021 | Wang et al. | |
| 2021/0281367 A1 | 9/2021 | Zhang et al. | |

FOREIGN PATENT DOCUMENTS

| | | | |
|---|---|---|---|
| CN | 101615986 | | 12/2009 |
| CN | 101667900 | | 3/2010 |
| CN | 102318254 | | 1/2012 |
| CN | 104301077 | | 1/2015 |
| CN | 105024781 | | 11/2015 |
| CN | 105515719 | | 4/2016 |
| CN | 105515733 | | 4/2016 |
| CN | 105530071 | | 4/2016 |
| CN | 105893271 | | 8/2016 |
| CN | 2017100146191 | * | 1/2017 |
| CN | 106411480 | | 2/2017 |
| CN | 108289011 | | 7/2018 |
| JP | 4495085 | | 6/2010 |
| JP | 2010147755 | | 7/2010 |
| KR | 20090039033 | | 4/2009 |
| KR | 20100004829 | | 1/2010 |
| KR | 20150013577 | | 2/2012 |
| KR | 1020130007614 | | 1/2013 |
| KR | 20140038480 | | 3/2014 |
| KR | 20150005632 | | 1/2015 |
| KR | 20150117631 | | 1/2015 |
| KR | 101696981 | | 1/2017 |
| RU | 2602385 | | 11/2016 |
| WO | WO2011140863 | | 11/2011 |
| WO | WO2012039570 | | 3/2012 |
| WO | WO2010109521 | | 9/2012 |
| WO | 1020130143073 | | 12/2013 |
| WO | WO2016003229 | | 1/2016 |
| WO | WO2016123372 | | 8/2016 |
| WO | WO20160149214 | | 9/2016 |

OTHER PUBLICATIONS

U.S. Appl. No. 62/431,461, filed Dec. 8, 2016.*
Office Action in Chinese Appln. No. 201880016978.3, dated Jul. 1, 2021, 16 pages (with English translation).
Office Action in U.S. Appl. No. 17/308,684, dated Jun. 29, 2021, 13 pages.
3GPP TSG RAN WG1 Meeting #88; R1-1702745; URLLC and eMBB DL Multiplexing using CRC masking and multi-bit NACK feedback; Athens, Green Feb. 13-17, 2017.
3rd Generation Partnership Project; Samsung; "Discussion on partial retransmission for eMBB," R1-1700959, 3GPP TSG RAN WG1, Spokane, USA, dated Jan. 2017, 4 pages.
Extended European Search Report in European Application No. 18764554.4, dated Sep. 30, 2019, 8 pages.
Extended European Search Report in European Application No. 19212163.0, dated Mar. 4, 2020, 8 pages.
Japanese Office Action in Japanese Application No. 2019-501529, dated Feb. 4, 2020, 6 pages (with English translation).
Lenovo, Motorola Mobility, "Enhanced HARQ feedback for downlink transmission," R1-1702665, 3GPP TSG RAN WG1 Meeting #88, Athens, Greece, dated Feb. 13-17, 2017, 3 pages, XP051209812.

(56) References Cited

OTHER PUBLICATIONS

MediaTek Inc., "On multiple HARQ bits per TB and feedback mechamsm," 3GPP TSG RAN WG 1 Meeting #88, dated Feb. 13-17, 2017, 5 pages.
Office Action in Russian Appln. No. 019100538, dated May 12, 2020, 11 pages (with English translation).
Russian Office Action in Russian Application No. 2019100538, dated May 12, 2020, 11 pages (with English translation).
Samsung et al., "WF on CB or CB-group based retransmission," 3GPP TSG RAN1#88, dated Feb. 13-17, 2017, 4 pages.
Samsung, "CB-group based retransmission for eMBB," 3GPP TSG RAN WG1 Meeting #88, dated Feb. 13-17, 2017, 10 pages.
Samsung, "Discussion on partial retransmission for eMBB," R1-1700959, 3GPP TSG RAN WG 1 Meeting NR#1, Spokane, USA, dated Jan. 16-20, 2017, 4 pages.
Samsung, "TB/CB Handling for eMBB", R1-1700958, 3GPP TSG RAN WG1 NR Ad-Hoc Meeting, Spokane, USA, Jan. 16-20, 2017, 5 pages.
Taiwan Office Action in Taiwanese Appln. No. 107107925, dated Jan. 9, 2019, 16 pages (with English translation).
United States Final Office Action in U.S. Appl. No. 16/065,739, dated Apr. 14, 2020, 8 pages.
United States Office Action in U.S. Appl. No. 16/065,739, dated Nov. 13, 2019, 9 pages.
ZTE et al., "NR HARQ timing and feedback schemes," 3GPP TSG RAN WG1 Meeting #88, dated Feb. 13-17, 2017, 9 pages.
Korean Notice of Allowance in Korean Application No. 10-2020-0092534, dated Nov. 23, 2020, 5 pages (with English translation).
Samsung, "Discussion on partial retransmission for eMBB," R1-1700959, 3GPP TSG RAN WG1 Meeting NR#1, Spokane, USA, Jan. 16-20, 2017, 4 pages.
United States Office Action in U.S. Appl. No. 16/065,739, dated Sep. 29, 2020, 10 pages.
United States Office Action in U.S. Appl. No. 17/036,800, dated Nov. 17, 2020, 13 pages.
Samsung, "Overview of CBG-based retransmission in NR," R1-1705401, 3GPP TSG RAN WG1 Meeting #88bis, Spokane, USA, dated Apr. 3-7, 2017, 4 pages.
Indian Office Action in Indian Application No. 201917001078, dated Aug. 1, 2020, 6 pages (with English translation).
Korean Notice of Allowance in Korean Application No. 10-2020-0005573, dated Jul. 13, 2020, 4 pages (with English translation).
Notice of Allowance in U.S. Appl. No. 17/308,684, dated Oct. 27, 2021, 8 pages.
Mediatek Inc., "Compact QC-LDPC design," R1-1702733, Presented at 3GPP TSG-RAN WG1 NR, Athens, Greece, Feb. 13-17, 2017, 72 pages.
Notice of Allowance in Korean Appln. No. 10-2022-0044728, dated Jul. 1, 2022, 6 pages (with English translation).
Non-Final Office Action in U.S. Appl. No. 17/003,449, dated May 10, 2022, 23 pages.
MediaTek Inc., "Discussion on multiple HARQ-ACK/NACK bits per TB," R1-1700165, Presented at 3GPP TSG RAN WG1 AH_NR Meeting, Spokane, USA, Jan. 16-20, 2017, 5 pages.
Office Action in Taiwanese Appln. No. 111131395, dated Nov. 11, 2022, 29 pages (with English translation).
Office Action in U.S. Appl. No. 17/235,319, dated Nov. 23, 2022, 10 pages.
MediaTek Inc.,"On multiple HARQ bits per TB and feedback mechanism," 3GPP TSG RAN WG1 Meeting #88, R1-1702738, Athens, Greece, Feb. 13-17, 2017, 4 pages.
Notice of Allowance in Korean Appln. No. 10-2022-0124130, dated Jun. 7, 2023, 4 pages (with English translation).
Office Action in Canadian Appln. No. 3146623, dated Mar. 29, 2023, 5 pages.
Fraunhofer HHI, "HARQ feedback schemes for NR," 3GPP TSG-RAN WG1#88, R1-1703309, Athens, Greece, Feb. 13-17, 2017, 3 pages.
Fujitsu, "Support of multi bit HARQ-ACK feedback per TB," 3GPP TSG RAN WG1 Meeting #88, R1-1701919, Athens, Greece, Feb. 13-17, 2017, 5 pages.
Notice of Allowance in Chinese Appln. No. 202110510129.7, dated Jul. 16, 2023, 8 pages (with English translation).

* cited by examiner

METHOD AND APPARATUS FOR TRANSMITTING AND RECEIVING RADIO SIGNALS IN A WIRELESS COMMUNICATION SYSTEM

CROSS-REFERENCE TO RELATED APPLICATIONS

This application is a continuation of U.S. application Ser. No. 15/930,694, filed on May 13, 2020, which is a continuation of U.S. application Ser. No. 16/262,373, filed on Jan. 30, 2019, now U.S. Pat. No. 10,721,046, which is a continuation of International Application No. PCT/KR2018/002743, filed on Mar. 8, 2018, which claims the benefit of Korean Application No. 10-2018-0027207, filed on Mar. 8, 2018, U.S. Provisional Application No. 62/566,339, filed on Sep. 30, 2017, U.S. Provisional Application No. 62/520,562, filed on Jun. 16, 2017, U.S. Provisional Application No. 62/501,048, filed on May 3, 2017, U.S. Provisional Application No. 62/475,860, filed on Mar. 23, 2017, U.S. Provisional Application No. 62/469,546, filed on Mar. 10, 2017, and U.S. Provisional Application No. 62/468,380, filed on Mar. 8, 2017. The disclosures of the prior applications are incorporated by reference in their entirety.

TECHNICAL FIELD

The present invention relates to a wireless communication system, and more specifically, to methods and devices for transmitting/receiving signals. The wireless communication system can support carrier aggregation (CA).

BACKGROUND

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, and the like.

SUMMARY

One object of the present invention is directed to provide a method of performing a radio signal transceiving process efficiently and apparatus therefor.

It is to be understood that technical objects to be achieved by the present invention are not limited to the aforementioned technical objects and other technical objects which are not mentioned herein will be apparent from the following description to one of ordinary skill in the art to which the present invention pertains.

In one aspect of the present invention, provided herein is a method of transmitting control information by a user equipment in a wireless communication system, including receiving information on a number N of code block groups defined for one transport block from a base station through an upper layer signal, receiving a first transport block including a plurality of code blocks from the base station through a physical layer channel, and transmitting Hybrid ARQ Acknowledgement (HARQ-ACK) payload including HARQ-ACK information on the first transport block to the base station, wherein a code block-based Cyclic Redundancy Check (CRC) is attached to each of the code blocks, wherein a transport block-based CRC is attached to the first transport block, and wherein the HARQ-ACK payload includes a plurality of HARQ-ACK bits corresponding to M code block groups for the first transport block.

In another aspect of the present invention, provided herein is a user equipment used in a wireless communication system, including a radio frequency (RF) module and a processor configured to receive information on a number M of code block groups defined for one transport block from a base station through an upper layer signal, receive a first transport block including a plurality of code blocks from the base station through a physical layer channel, and transmit Hybrid ARQ Acknowledgement (HARQ-ACK) payload including HARQ-ACK information on the first transport block to the base station, wherein a code block-based Cyclic Redundancy Check (CRC) is attached to each of the code blocks, wherein a transport block-based CRC is attached to the first transport block, and wherein the HARQ-ACK payload includes a plurality of HARQ-ACK bits corresponding to M code block groups for the first transport block.

Preferably, the upper layer signal may include an Radio Resource Control (RRC) signal and the physical layer channel may include a Physical Downlink Shared Channel (PDSCH).

Preferably, a size of the HARQ-ACK payload may be maintained as same based on the M during an HARQ process for the first transport block.

Preferably, if the first transport block is configured with a plurality of code block groups, some of a plurality of the code block groups may include ceiling(K/M) code blocks and the rest of a plurality of the code block groups include flooring(K/M) code blocks, and wherein the ceiling is an ascending function, the flooring is a descending function, and the K indicates the number of code blocks in the first transport block.

Preferably, if a code block group is configured for the first transport block, each HARQ-ACK bit in the HARQ-ACK payload may indicate each HARQ-ACK information generated in a code block group unit for the first transport block.

Preferably, if a code block group for the first transport block is not configured, a plurality of HARQ-ACK bits for the first transport block in the HARQ-ACK payload may have a same value and each of the HARQ-ACK bits for the first transport block may indicate HARQ-ACK information generated in a transport block group unit for the first transport block.

Preferably, if all code block group-based CRC checks for the first transport block are 'pass' but a transport block-based CRC check result is 'fail', all of a plurality of HARQ-ACK bits for the first transport block in the HARQ-ACK payload may indicate Negative Acknowledgement (NACK).

In another aspect of the present invention, provided herein is a method of receiving control information by a base station in a wireless communication system, the method including transmitting information on a number M of code block groups defined for one transport block to a user equipment through an upper layer signal, transmitting a first transport block including a plurality of code blocks to the user equipment through a physical layer channel, and receiving Hybrid ARQ Acknowledgement (HARQ-ACK) payload including HARQ-ACK information on the first transport block from the user equipment, wherein a code block-based Cyclic Redundancy Check (CRC) is attached to each of the code blocks, wherein a transport block-based CRC is attached to the first transport block, and wherein the HARQ-ACK payload includes a plurality of HARQ-ACK bits corresponding to M code block groups for the first transport block.

In further aspect of the present invention, provided herein is a base station used in a wireless communication system, the base station including a radio frequency (RF) module and a processor configured to transmit information on a number M of code block groups defined for one transport block to a user equipment through an upper layer signal, transmit a first transport block including a plurality of code blocks to the user equipment through a physical layer channel, and receive Hybrid ARQ Acknowledgement (HARQ-ACK) payload including HARQ-ACK information on the first transport block from the user equipment, wherein a code block-based Cyclic Redundancy Check (CRC) is attached to each of the code blocks, wherein a transport block-based CRC is attached to the first transport block, and wherein the HARQ-ACK payload includes a plurality of HARQ-ACK bits corresponding to M code block groups for the first transport block.

According to the present invention, radio signals can be efficiently transceived in a wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention.

DETAILED DESCRIPTION

The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. TDMA can be implemented by wireless communication technologies, for example, a Global System for Mobile communications (GSM), a General Packet Radio Service (GPRS), an Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of a Universal Mobile Telecommunications System (UMTS). 3rd Generation Partnership Project (3GPP) Long Term Evolution (LTE) is a part of an Evolved UMTS (E-UMTS) that uses an E-UTRA. The LTE-Advanced (LTE-A) is an evolved version of 3GPP LTE. Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto.

In a wireless communication system, a UE (user equipment) receives information in downlink (DL) from a BS (base station), and the UE sends information in uplink (UL) to the BS. Information transceived between the BS and the UE include data and various control informations, and various physical channels exist according to a type/usage of the information transceived by them.

Figure 1:
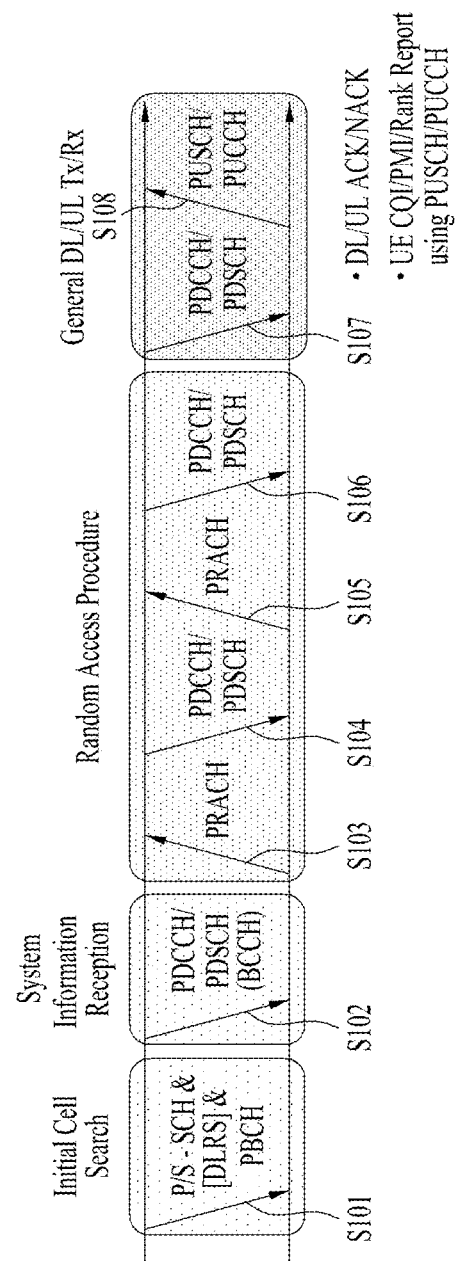
FIG. 1 is a conceptual diagram illustrating physical channels used in a 3GPP LTE system acting as an exemplary mobile communication system and a general method for transmitting a signal using the physical channels.

FIG. 1 illustrates physical channels used in a 3GPP LTE/LTE-A system and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Here, control information transmitted from the UE to the BS is called uplink control information (UCI). The UCI may include a hybrid automatic repeat and request (HARQ) acknowledgement (ACK)/negative-ACK (HARQ ACK/NACK) signal, a scheduling request (SR), channel state information (CSI), etc. The CSI includes a channel quality indicator (CQI), a precoding matrix index (PMI), a rank indicator (RI), etc. While the UCI is transmitted through a PUCCH in general, it may be transmitted through a PUSCH when control information and traffic data need to be simultaneously transmitted. The UCI may be aperiodically transmitted through a PUSCH at the request/ instruction of a network.

Figure 2A:
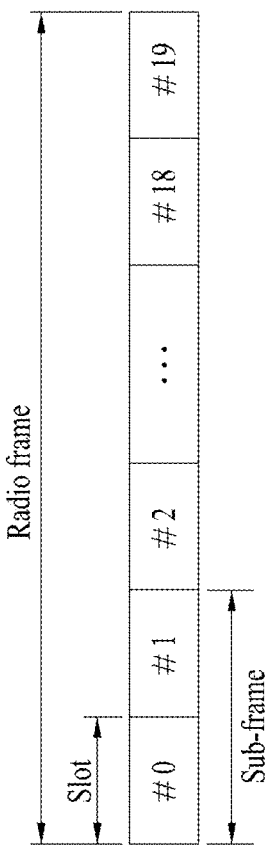
FIGS. 2A and 2B are diagrams illustrating a structure of a radio frame.
Figure 2B:
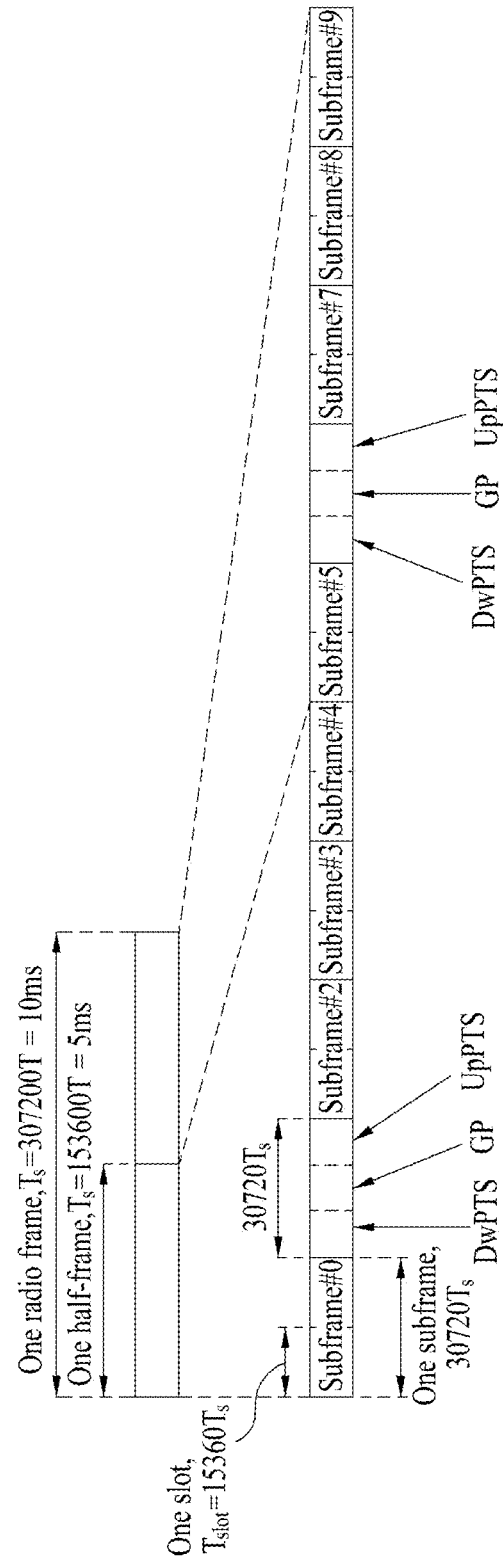

FIGS. 2A and 2B illustrate a radio frame structure. In a cellular OFDM wireless packet communication system, uplink/downlink data packet transmission is performed on a subframe-by-subframe basis. A subframe is defined as a predetermined time interval including a plurality of OFDM symbols. 3GPP LTE supports a type-1 radio frame structure applicable to FDD (Frequency Division Duplex) and a type-2 radio frame structure applicable to TDD (Time Division Duplex).

FIG. 2A illustrates a type-1 radio frame structure. A downlink subframe includes 10 subframes each of which includes 2 slots in the time domain. A time for transmitting a subframe is defined as a transmission time interval (TTI). For example, each subframe has a length of 1 ms and each slot has a length of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on Cyclic Prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2B illustrates a type-2 radio frame structure. The type-2 radio frame includes 2 half frames. Each half frame includes 4(5) normal subframes and 1(0) special subframe. Normal subframes are used for an uplink or a downlink according to UL-DL configuration. A subframe includes 2 slots.

Table 1 shows subframe configurations in a radio frame according to UL-DL configuration.

TABLE 1

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE. UpPTS is used for channel estimation in a BS and UL transmission synchronization acquisition in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
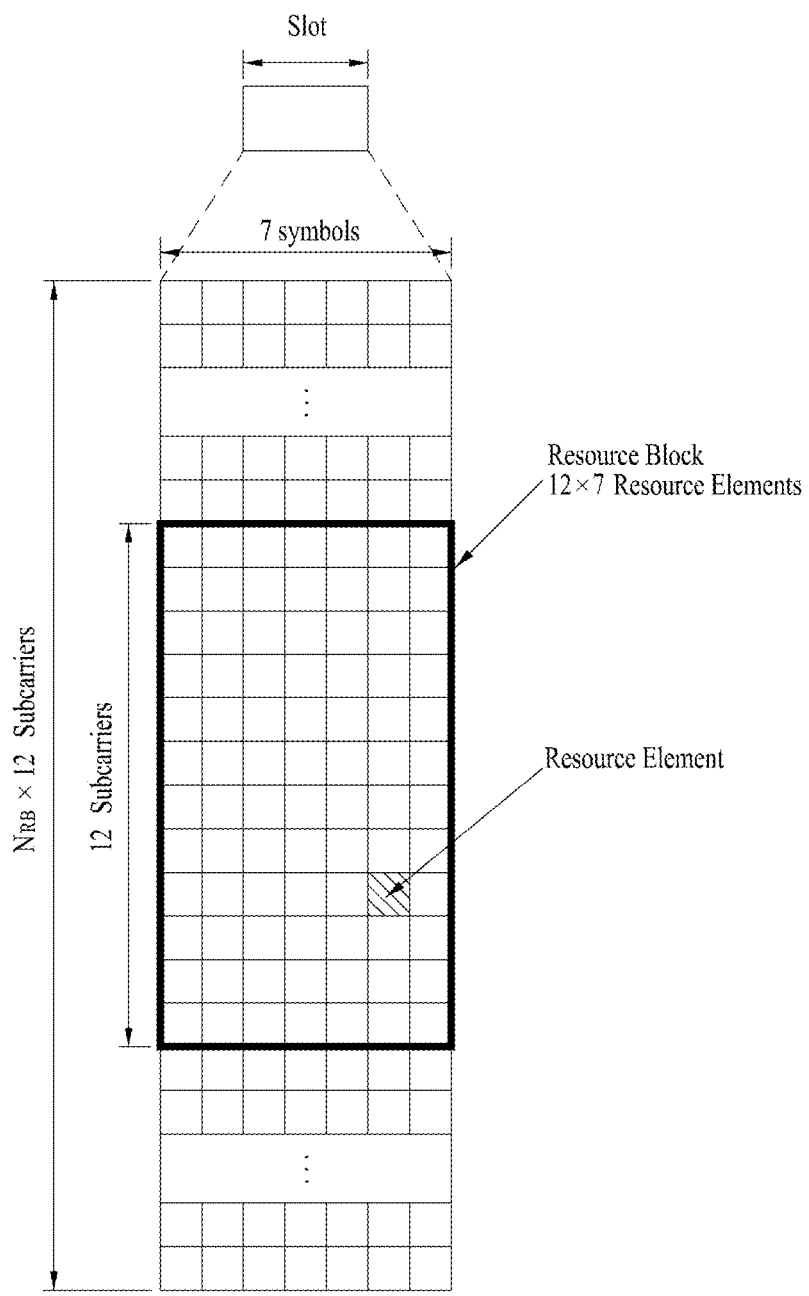
FIG. 3 exemplarily shows a resource grid of a downlink slot.

FIG. 3 illustrates a resource grid of a downlink slot.

Referring to FIG. 3, a downlink slot includes a plurality of OFDM symbols in the time domain. One downlink slot may include 7 OFDM symbols, and one resource block (RB) may include 12 subcarriers in the frequency domain. However, the present invention is not limited thereto. Each element on the resource grid is referred to as a resource element (RE). One RB includes 12×7 REs. The number $N^{DL}$ of RBs included in the downlink slot depends on a downlink transmit bandwidth. The structure of an uplink slot may be same as that of the downlink slot.

Figure 4:
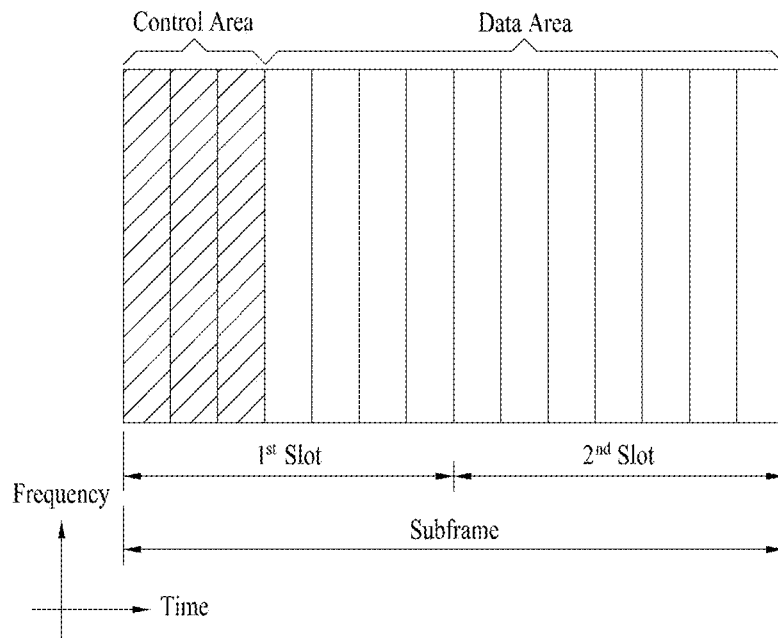
FIG. 4 illustrates a downlink frame structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UE group.

Control information transmitted through a PDCCH is referred to as DCI. Formats 0, 3, 3A and 4 for uplink and formats 1, 1A, 1B, 1C, 1D, 2, 2A, 2B and 2C for downlink are defined as DCI formats. Information field types, the number of information fields and the number of bits of each information field depend on DCI format. For example, the DCI formats selectively include information such as hopping flag, RB allocation, MCS (modulation coding scheme), RV (redundancy version), NDI (new data indicator), TPC (transmit power control), HARQ process number, PMI (precoding matrix indicator) confirmation as necessary. A DCI format can be used to transmit control information of two or more types. For example, DCI format 0/1A is used to carry DCI format 0 or DCI format 1, which are discriminated from each other by a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI which includes resource assignment information and other control information for a UE or UE group. In general, a plurality of PDCCHs can be transmitted in a subframe. Each PDCCH is transmitted using one or more CCEs. Each CCE corresponds to 9 sets of 4 REs. The 4 REs are referred to as an REG. 4 QPSK symbols are mapped to one REG. REs allocated to a reference signal are not included in an REG, and thus the total number of REGs in OFDM symbols depends on presence or absence of a cell-specific reference signal. The concept of REG (i.e. group based mapping, each group including 4 REs) is used for other downlink control channels (PCFICH and PHICH). That is, REG is used as a basic resource unit of a control region. 4 PDCCH formats are supported as shown in Table 2.

TABLE 2

| PDCCH format | Number of CCEs (n) | Number of REGs | Number of PDCCH bits |
| --- | --- | --- | --- |
| 0 | 1 | 9 | 72 |
| 1 | 2 | 8 | 144 |

TABLE 2-continued

| PDCCH format | Number of CCEs (n) | Number of REGs | Number of PDCCH bits |
| --- | --- | --- | --- |
| 2 | 4 | 36 | 288 |
| 3 | 5 | 72 | 576 |

The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by the BS according to the channel state. For example, one CCE may be required for a PDCCH for a UE (for example, adjacent to the BS) having a good downlink channel. However, in case of a PDCCH for a UE (for example, located near the cell edge) having a poor channel, eight CCEs may be required to obtain sufficient robustness. Additionally, the power level of the PDCCH may be adjusted according to the channel state.

LTE defines CCE positions in a limited set in which PDCCHs can be positioned for each UE. CCE positions in a limited set that the UE needs to monitor in order to detect the PDCCH allocated thereto may be referred to as a search space (SS). In LTE, the SS has a size depending on PDCCH format. A UE-specific search space (USS) and a common search space (CSS) are separately defined. The USS is set per UE and the range of the CSS is signaled to all UEs. The USS and the CSS may overlap for a given UE. In the case of a considerably small SS with respect to a specific UE, when some CCEs positions are allocated in the SS, remaining CCEs are not present. Accordingly, the BS may not find CCE resources on which PDCCHs will be transmitted to available UEs within given subframes. To minimize the possibility that this blocking continues to the next subframe, a UE-specific hopping sequence is applied to the starting point of the USS.

Table 3 shows sizes of the CSS and USS.

TABLE 3

| PDCCH format | Number of CCEs (n) | Number of candidates in common search space | Number of candidates in dedicated search space |
| --- | --- | --- | --- |
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. PDSCH transmission schemes and information content of DCI formats according to transmission mode (TM) are arranged below.

Transmission Mode (TM)

Figure 5:
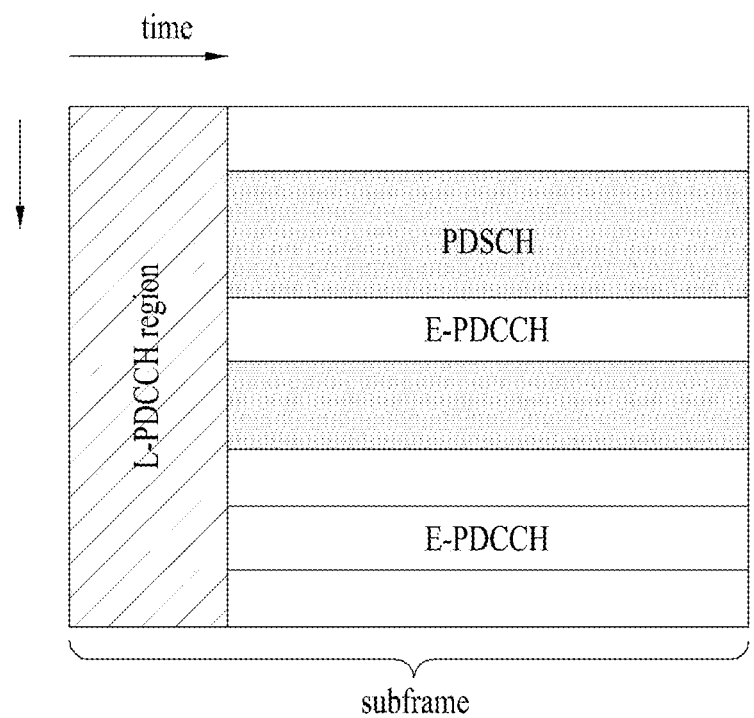
FIG. 5 exemplarily shows EPDCCH (enhanced Physical Downlink Control Channel.

Transmission mode 1: Transmission from a single base station antenna port
Transmission mode 2: Transmit diversity
Transmission mode 3: Open-loop spatial multiplexing
Transmission mode 4: Closed-loop spatial multiplexing
Transmission mode 5: Multi-user MIMO
Transmission mode 6: Closed-loop rank-1 precoding
Transmission mode 7: Single-antenna port (port5) transmission
Transmission mode 8: Double layer transmission (ports 7 and 8) or single-antenna port (port 7 or 8) transmission
Transmission mode 9: Transmission through up to 8 layers (ports 7 to 14) or single-antenna port (port 7 or 8) transmission DCI Format Format 0: Resource grants for the PUSCH transmissions (uplink)
Format 1: Resource assignments for single codeword PDSCH transmissions (transmission modes 1, 2 and 7)
Format 1A: Compact signaling of resource assignments for single codeword PDSCH (all modes)
Format 1B: Compact resource assignments for PDSCH using rank-1 closed loop precoding (mod 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/1-bit power adjustments FIG. 5 illustrates an EPDCCH. The EPDCCH is a channel additionally introduced in LTE-A.

Referring to FIG. 5, a PDCCH (for convenience, legacy PDCCH or L-PDCCH) according to legacy LTE may be allocated to a control region (see FIG. 4) of a subframe. In the figure, the L-PDCCH region means a region to which a legacy PDCCH may be allocated. Meanwhile, a PDCCH may be further allocated to the data region (e.g., a resource region for a PDSCH). A PDCCH allocated to the data region is referred to as an E-PDCCH. As shown, control channel resources may be further acquired via the E-PDCCH to mitigate a scheduling restriction due to restricted control channel resources of the L-PDCCH region. Similarly to the L-PDCCH, the E-PDCCH carries DCI. For example, the E-PDCCH may carry downlink scheduling information and uplink scheduling information. For example, the UE may receive the E-PDCCH and receive data/control information via a PDSCH corresponding to the E-PDCCH. In addition, the UE may receive the E-PDCCH and transmit data/control information via a PUSCH corresponding to the E-PDCCH. The E-PDCCH/PDSCH may be allocated starting from a first OFDM symbol of the subframe, according to cell type. In this specification, the PDCCH includes both L-PDCCH and EPDCCH unless otherwise noted.

Figure 6:
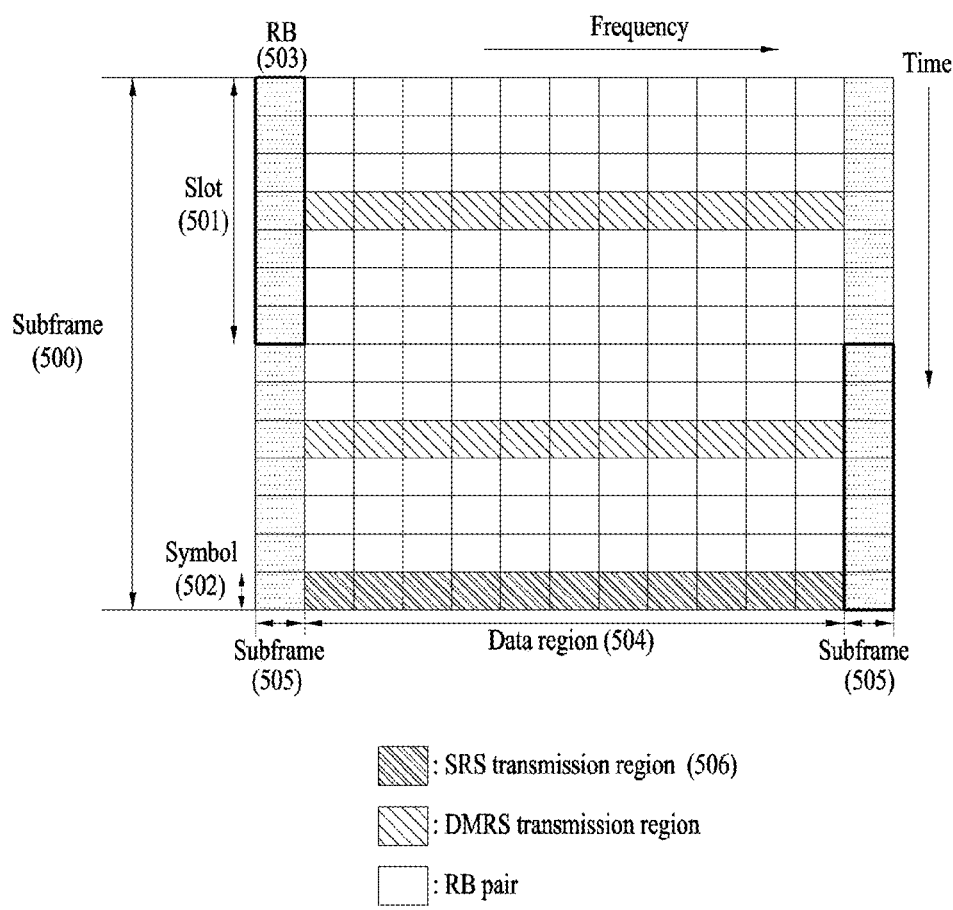
FIG. 6 exemplarily shows a structure of an uplink (UL) subframe used for LTE/LTE-A.
Figure 7:
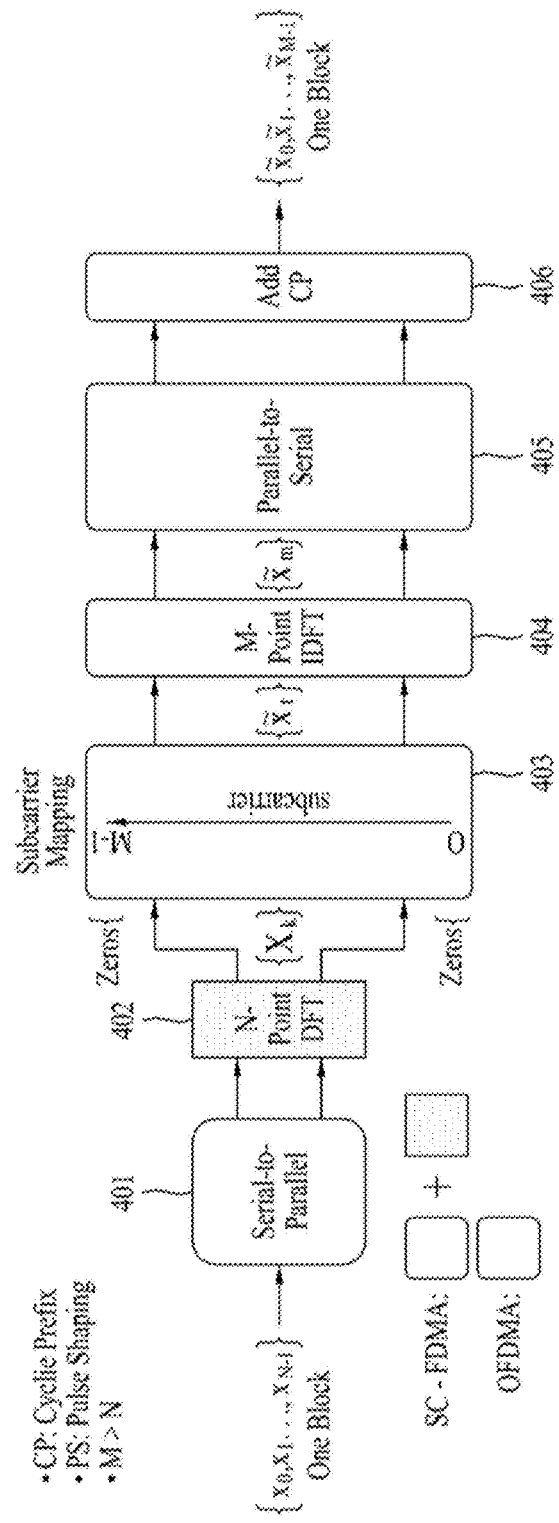
FIG. 7 exemplarily shows SC-FDMA (Single Carrier Frequency Division Multiple Access) and OFDMA (Orthogonal Frequency Division Multiple Access).

FIG. 6 illustrates an uplink subframe structure used in LTE(-A)

Referring to FIG. 6, a subframe 500 includes two 0.5 ms slots 501. When a normal CP length is used, each slot includes 7 symbols 502 each corresponding to an SC-FDMA symbol. A resource block 503 is a resource allocation unit corresponding to 12 subcarriers in the frequency domain and to a slot in the time domain. The uplink subframe structure of LTE(-A) is divided into a data region 504 and a control region 505. The data region refers to a communication resource used for a UE to transmit data such as audio data, packets, etc., and includes a PUSCH (physical uplink shared channel). The control region means a communication resource used in sending a UL control signal (e.g., a DL channel quality report from ach UE, ACK/NACK of reception for a DL signal, a UL scheduling request, etc.), and includes PUCCH (Physical Uplink Control Channel). A sounding reference signal (SRS) is transmitted through SC-FDMA symbol located at the last on a time axis in a single subframe. Several UEs' SRSs transmitted by last SC-FDMA of the same frame can be sorted according to a frequency location/sequence. SRS is used to send UL channel state to the BS. The STS may be periodically transmitted according to a subframe period/offset configured by an upper layer (e.g., RRC layer), or aperiodically transmitted in response to a BS's request.

FIG. 5 illustrates SC-FDMA and OFDMA schemes. The 3GPP system employs OFDMA in downlink and uses SC-FDMA in uplink.

Referring to FIG. 5, both a UE for transmitting an uplink signal and a BS for transmitting a downlink signal include a serial-to-parallel converter 401, a subcarrier mapper 403, an M-point IDFT module 404, and a cyclic prefix (CP) adder 406. The UE for transmitting a signal according to SC-FDMA additionally includes an N-point DFT module 402.

In the following, HARQ (Hybrid Automatic Repeat reQuest) is described. In a wireless communication, when there exist a multitude of UEs having data to transmit in UL/DL, a BS selects a UE to transmit data thereto in each TTI (transmission time interval) (e.g., subframe). In a multi-carrier system or a system operated similarly thereto, a BS selects UEs to transmit data in UL/DL link and also selects a frequency band used for data transmission by the corresponding UE.

The following description is made with reference to UL. First of all, UEs transmit reference (or pilot) signals in UL and a BS selects UEs to transmit data in UL on a unit frequency band in each TTI by obtaining channel states of the UEs using the reference signals transmitted by the UEs. The BS informs the UE of such a result. Namely, the BS sends a UL assignment message indicating to send data using a specific frequency band to a UE UL-scheduled in specific TTI. The UL assignment message may be referred to as a UL grant. The UE transmits data in UL according to the UL assignment message. The UL assignment message may include UE ID (UE Identity), RB allocation information, MCS (Modulation and Coding Scheme), RV (Redundancy Version), New Data Indication (NDI), etc.

In case of synchronous HARQ, a retransmission time is promised systematically (e.g., after 4 subframes from an NACK received time) (synchronous HARQ). Hence, a UE grant message sent to a UE by a BS is just sent in case of an initial transmission. Thereafter, a retransmission is performed by an ACK/NACK signal (e.g., PHICH signal). In case of asynchronous HARQ, since a retransmission time is not promised mutually, a BS should send a retransmission request message to a UE. In case of non-adaptive HARQ, a frequency resource or MCS for retransmission is identical to that for a previous transmission. In case of adaptive HARQ, a frequency resource or MCS for retransmission may be different from that for a previous transmission. For example, in case of asynchronous adaptive HARQ, since a frequency resource or MCS for retransmission varies at every transmission timing, a retransmission request message may contain UE ID, RB allocation information, HARQ process ID/number, RV, NDI information, etc.

Figure 8:
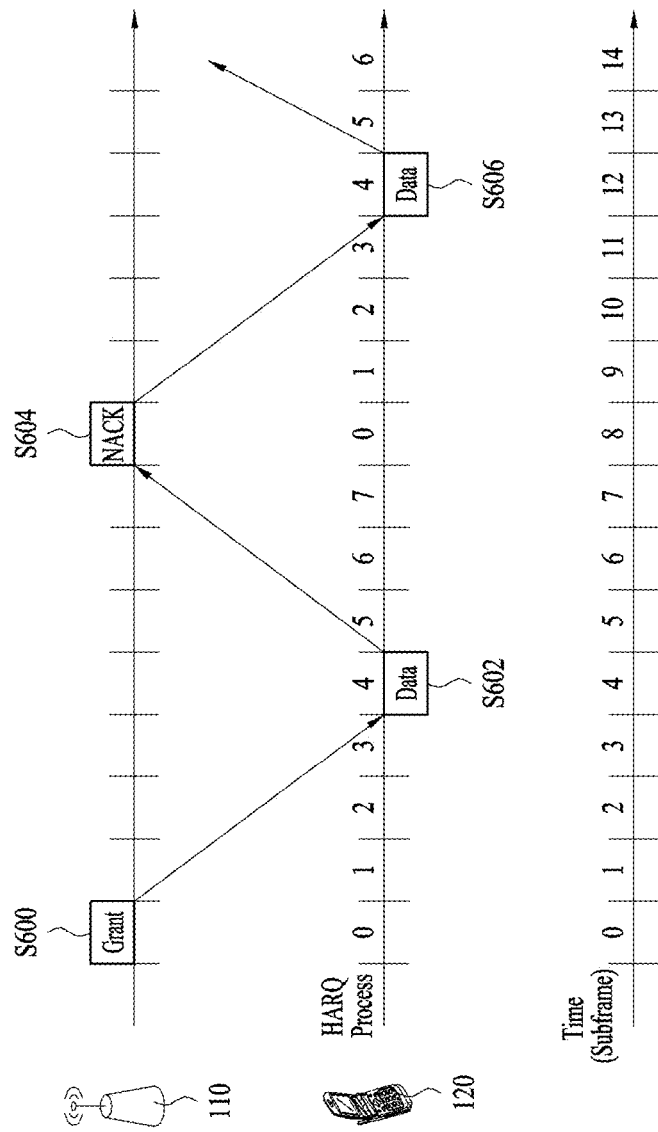
FIG. 8 exemplarily shows a UL HARQ (Uplink Hybrid Automatic Repeat reQuest) operation.

FIG. 8 exemplarily shows a UL HARQ operation in LTE/LTE-A system. In the LTE/LTE-A system, UL HARQ uses synchronous non-adaptive HARQ. In case of using 8-channel HARQ, HARQ process numbers are given as 0~7. A single HARQ process operates in every TTI (e.g., subframe). Referring to FIG. 8, a BS 110 transmits a UL grant to a UE 120 through PDCCH [S600]. The UE 120 transmits UL data to the BS 110 using RB and MCS designated by a UL grant after 4 subframes from a timing (e.g., subframe 0) of receiving the UL grant [S602]. The BS 110 decodes the UL data received from the UE 120 and then generates ACK/NACK. If failing in decoding the UL data, the BS 110 transmits NACK to the UE 120 [S604]. The UE 120 retransmits UL data after 4 subframes from a timing of receiving the NACK [S606]. The same HARQ processor is responsible for the initial transmission and retransmission of the UL data (e.g., HARQ process 4). ACK/NACK information may be transmitted through PHICH.

Meanwhile, DL HARQ in the LTE/KTE-A system uses asynchronous adaptive HARQ. Particularly, the base station 110 sends a DL grant to the UE 120 through PDCCH. The UE 120 receives DL data from the BS 110 using RB and MCS designated by the DL grant at a timing (e.g., subframe 0) of receiving the DL grant. The UE 120 decodes the DL data and then generates ACK/NACK. If failing in decoding the DL data, the UE 120 sends NACK to the BS 110 after 4 subframes (e.g., subframe 4) from the timing of receiving the DL data. Thereafter, the BS 110 sends a DL grant, which indicates a retransmission of DL data, to the UE 120 through PDCCH at a desired timing (e.g., subframe X). The UE 120 receives DL data again from the BS 110 using the RC and MCS designated by the DL grant at the timing (e.g., subframe X) of receiving the DL grant.

For DL/UL transmission, a plurality of parallel HARQ processes exist in BS/UE. A plurality of parallel the HARQ processes enable DL/UL transmissions to be consecutively performed while waiting for HARQ feedback of ACK or NACK for a previous DL/UL transmission. Each of the HARQ processes is associated with an HARQ buffer of a MAC (medium access control) layer. Each of the HARQ processes manages state variables for the transmission count of MAC PDU (physical data block) in a buffer, HARQ feedback for MAC PDU in a buffer, a current redundancy version, etc.

The HARQ process is responsible for reliable transport of data (e.g., transport block (TB)). When channel coding is performed, a transport block can be divided into at least one code block (CB) by considering a size of a channel encoder. After channel coding, at least one or more code blocks are concatenated to configure a codeword (CW) corresponding to a transport block.

Figure 9:
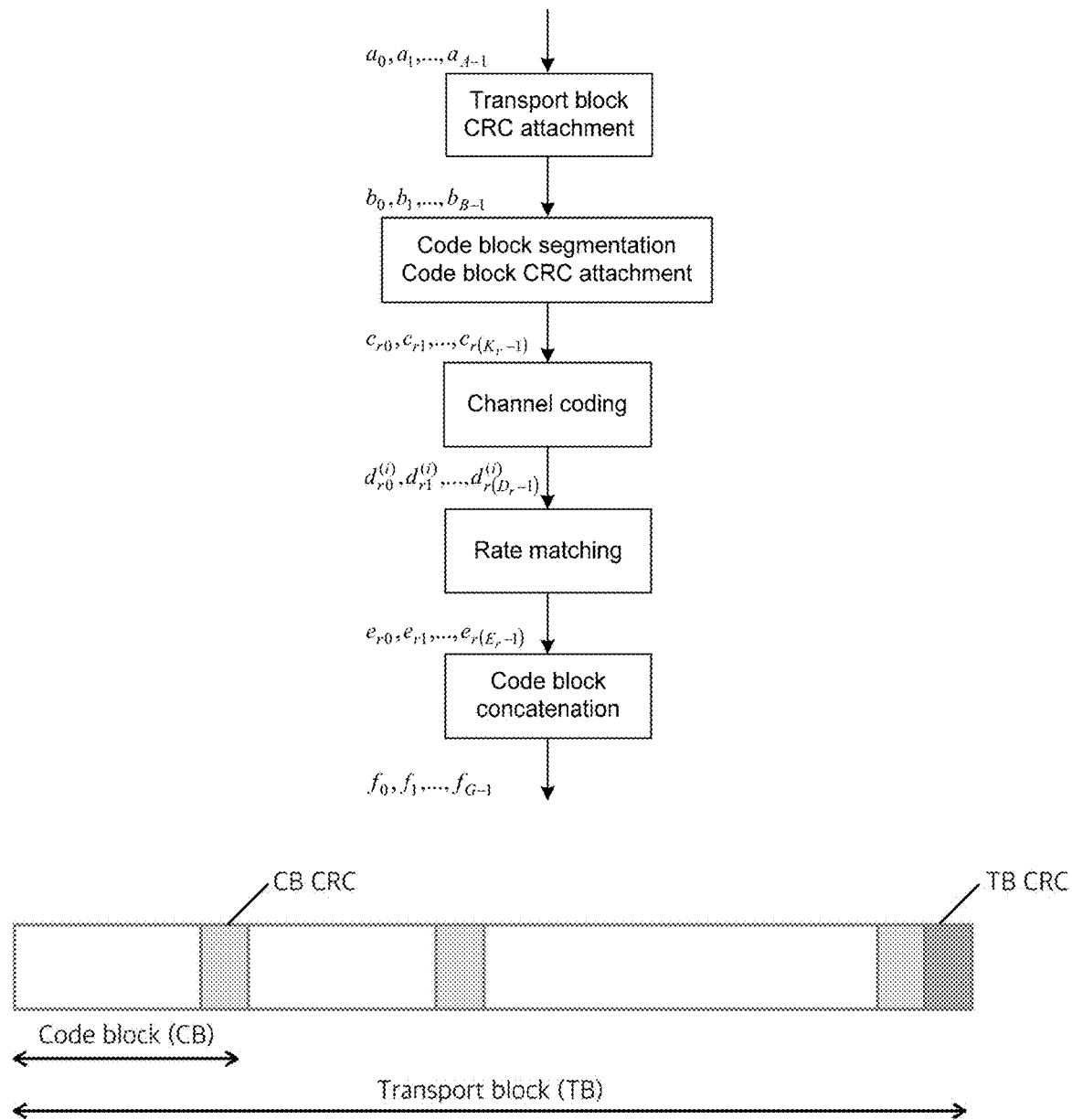
FIG. 9 exemplarily shows a transport block (TB) processing process.

FIG. 9 exemplarily shows a transport block (TB) processing process. A process of FIG. 9 is applicable to data of DL-SCH, PCH and MCH (multicast channel) transport channel. UL TB (or data of UL transport channel) can be processed similarly.

Referring to FIG. 9, a transmitter applies a CRC (e.g., 24 bits) (TB CRC) for error check to a TB. Thereafter, the transmitter can segment (TB+CRC) into a plurality of code blocks by considering a size of a channel encoder. A maximum size of a code block in LTE/LTE-A is 6144 bits. Hence, if a TB size is equal to or smaller than 6144 bits, a code block is not configured. If a TB size is greater than 6144 bits, a TB is segmented by 6144-bit unit to configure a plurality of code blocks. A CRC (e.g., 24 bits) (CB CRV) is individually attached to each of the code blocks for error check. The respective code blocks go through channel coding and rate matching and are then concatenated into one to configure a codeword. In LTE/LTE-A, data scheduling and a corresponding HRAQ process is performed by TB unit and CB CRC is used to determine an early termination of TB decoding.

An HARQ process is associated with a soft buffer for a transport block and a soft buffer for a code block on a PHY (physical) layer. A circular buffer having a length ($K_w = 3K_\Pi$) for an r-th code block at a transmitting end is generated as follows.

$$w_k = v_k^{(0)} \quad \text{for } k = 0, \ldots, K_\Pi - 1 \quad \text{Formula 1}$$
$$w_{K_\Pi + 2k} = v_k^{(1)} \quad \text{for } k = 0, \ldots, K_\Pi - 1$$
$$w_{K_\Pi + 2k + 1} = v_k^{(2)} \quad \text{for } k = 0, \ldots, K_\Pi - 1$$

$N_{IR}$ bit indicates a soft buffer size for transport block, abd $N_{cb}$ indicates a soft buffer size for the r-th code block. $N_{cb}$ is found as follows, where C indicates the number of code blocks.

$$N_{cb} = \min\left(\left\lfloor \frac{N_{IR}}{C_n} \right\rfloor, K_w\right) \quad \text{Case of DL-SCH and PCH transport channels} \quad \text{Formula 2}$$
$$N_{cb} = K_w \quad \text{Case of UL-SCH and PCH transport channels}$$

$N_{IR}$ is expressed as follows.

$$N_{IR} = \left\lfloor \frac{N_{soft}}{K_C \cdot K_{MIMO} \cdot \min(M_{DL\_HARQ}, M_{limit})} \right\rfloor \quad \text{Formula 3}$$

Here, $N_{soft}$ indicates the total number of soft channel bits according to UE ability.

If $N_{soft}$=35982720, $K_C$=5,
else if $N_{soft}$=3654144 and a UE is capable of supporting maximum 2 spatial layers for a DL cell, $K_C$=2
else $K_C$=1
End if.

$K_{MIMO}$ is 2 if a UE is configured to receive PDSCH transmission based on a transmission mode 3, 4, 8 or 9. Otherwise, $K_{MIMO}$ is 1.

$M_{DL\_HARQ}$ is the maximum number of DL HARQ processes.

$0M_{limit}$ is 8.

In FDD and TDD, a UE is configured to have two or more serving cells. For at least $K_{MIMO} \cdot \min(M_{DL\_HARQ}, M_{limit})$ transport blocks, if failing in the decoding of code blocks of the transport block, the UE stores the received soft channel bits corresponding to a range of $w_k, w_{k+1}, \ldots, w_{mod(k+n_{SB}-1, N_{cb})}$ at least. $n_{SB}$ is given by the following formula.

$$n_{SB} = \min\left(N_{cb}, \left\lfloor \frac{N'_{soft}}{C \cdot N_{cells}^{DL} \cdot K_{MIMO} \cdot \min(M_{DL\_HARQ}, M_{limit})} \right\rfloor\right),\quad \text{Formula 4}$$

$w_k$, C, $N_{cb}$, $K_{MIMO}$, and $M_{limit}$ are identical to those of the foregoing definition.

$M_{DL\_HARQ}$ is the maximum number of DL HARQ processes.

$N_{cells}^{DL}$ is the number of the configured serving cells.

$N'_{soft}$ is the total number of soft channel bits according to UE ability.

When k is determined, a UE prioritizes the storage of soft channel bits corresponding to k of low values. $w_k$ corresponds to the received soft channel bits. The range $w_k\ w_{k+1}, \ldots, w_{mod(k+n_{SB}-1, N_{cb})}$ may include a subset failing to be included in the received soft channel bits.

Scheduling for UL transmission in LTE is enabled only if UL transmission timing of a user equipment is synchronized. A random access procedure is used for various usages. For instance, a random access procedure is performed in case of an initial network access, a handover, a data occurrence or the like. A user equipment may be able to obtain UL synchronization via the random access procedure. Once the UL synchronization is obtained, a base station may be able to allocate a resource for UL transmission to the corresponding user equipment. The random access procedure may be classified into a contention based procedure and a non-contention based procedure.

Figure 10:
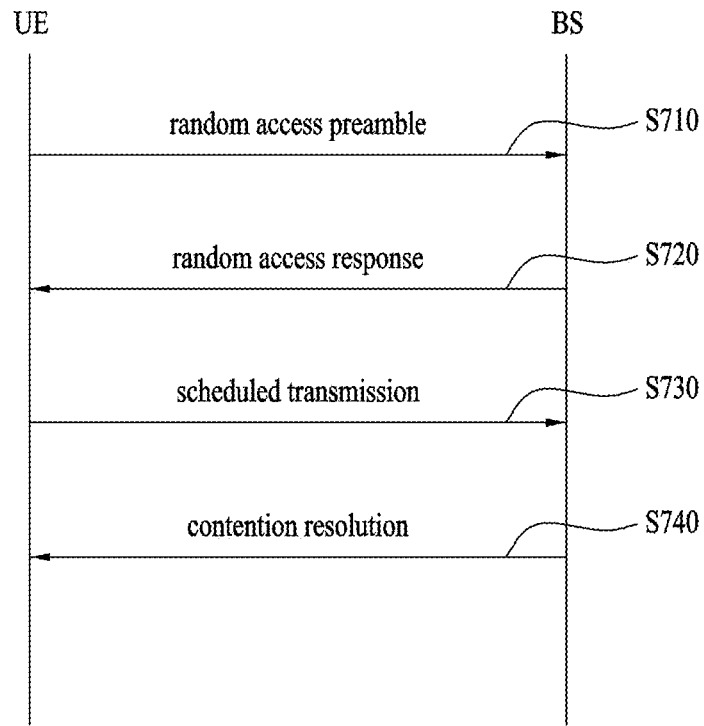
FIG. 10 and FIG. 11 exemplarily show a random access procedure.

FIG. 10 is a diagram for one example of a contention based random access procedure.

Referring to FIG. 10, a user equipment receives information on a random access from a base station via system information. Thereafter, if the random access is required, the user equipment transmits a random access preamble (or a message 1) to the base station (S710). Once the base station receives the random access preamble from the user equipment, the base station sends a random access response message (or, a message 2) to the user equipment (S720). In particular, a DL scheduling information on the random access response message may be transmitted on L1/L2 control channel (PDCCH) by being CRC masked with RA-RNTI (random access-RNTI). Having received the RA-RNTI masked DL scheduling signal, the user equipment receives the random access response message on PDSCH and may be then able to decode the received random access response message. Subsequently, the user equipment checks whether a random access response information indicated to the user equipment is included in the received random access response message. In doing so, a presence or non-presence of the random access response information indicated to the user equipment may be checked in a manner of checking whether RAID (random access preamble ID) for the preamble having transmitted by the user equipment is present or not. The random access response information may include a timing advance indicating a timing offset information for synchronization, a radio resource allocation information on a resource used in UL, a temporary identifier (e.g., T-RNTI) for user equipment (UE) identification and the like. Once the random access response information is received, the user equipment sends a UL message (or, a message 3) on UL SCH (uplink shared channel) in accordance with the radio resource allocation information included in the received random access response information (S730). Having received the UL message from the user equipment in the step S730, the base station sends a contention resolution message (or, a message 4) to the user equipment (S740).

Figure 11:
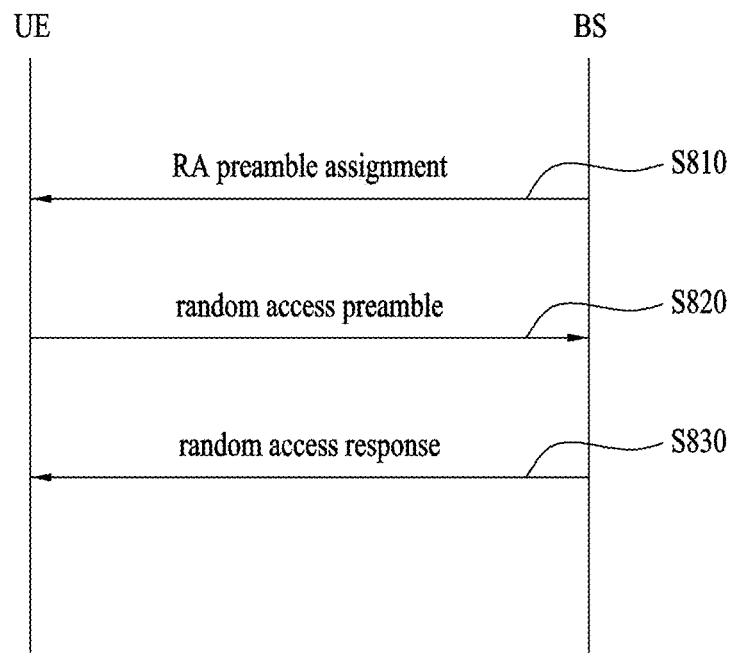

FIG. 11 is a diagram for one example of a non-contention based random access procedure. A non-contention based random access procedure may be used in a handover procedure or may exist if requested by an order given by a base station. A basic procedure is as good as a contention based random access procedure.

Referring to FIG. 11, a user equipment receives assignment of a random access preamble (i.e., a dedicated random access preamble) for the user equipment only from a base station (S810). A dedicated random access preamble indication information (e.g., a preamble index) may be included in a handover command message or may be received on PDCCH. The user equipment transmits the dedicated random access preamble to the base station (S820). Thereafter, the user equipment receives a random access response from the base station (S830) and the random access procedure is ended.

In order to indicate a non-contention based random access procedure with a PDCCH order, DCI format 1A is used. And, the DCI format 1A may be used for compact scheduling for one PDSCH codeword. The following information is transmitted using the DCI format 1A.

Flag for identifying DCI format 0 or DCI format 1A: This flag is 1-bit flag. A flag value '0' indicates DCI format 0 and a flag value '1' indicates DCI format 1A.

If all the fields remaining after scrambling CRC of DCI format 1A with C-RNTI are set as follows, the DCI format 1A may be used for a random access procedure according to a PDCCH order.

Localized/distributed VRB (virtual resource block) assignment flag: This flag is 1-bit flag. This flag is set to 0.

Resource block assignment information: $\lceil \log_2(N_{RB}^{DL}(N_{RB}^{DL}+1)/2) \rceil$. Every bit is set to 1.

Preamble index: 6 bits

PRACH mask index: 4 bits

All the remaining bits for compact scheduling of PDSCH in DCI format 1A are set to 0.

Figure 12:
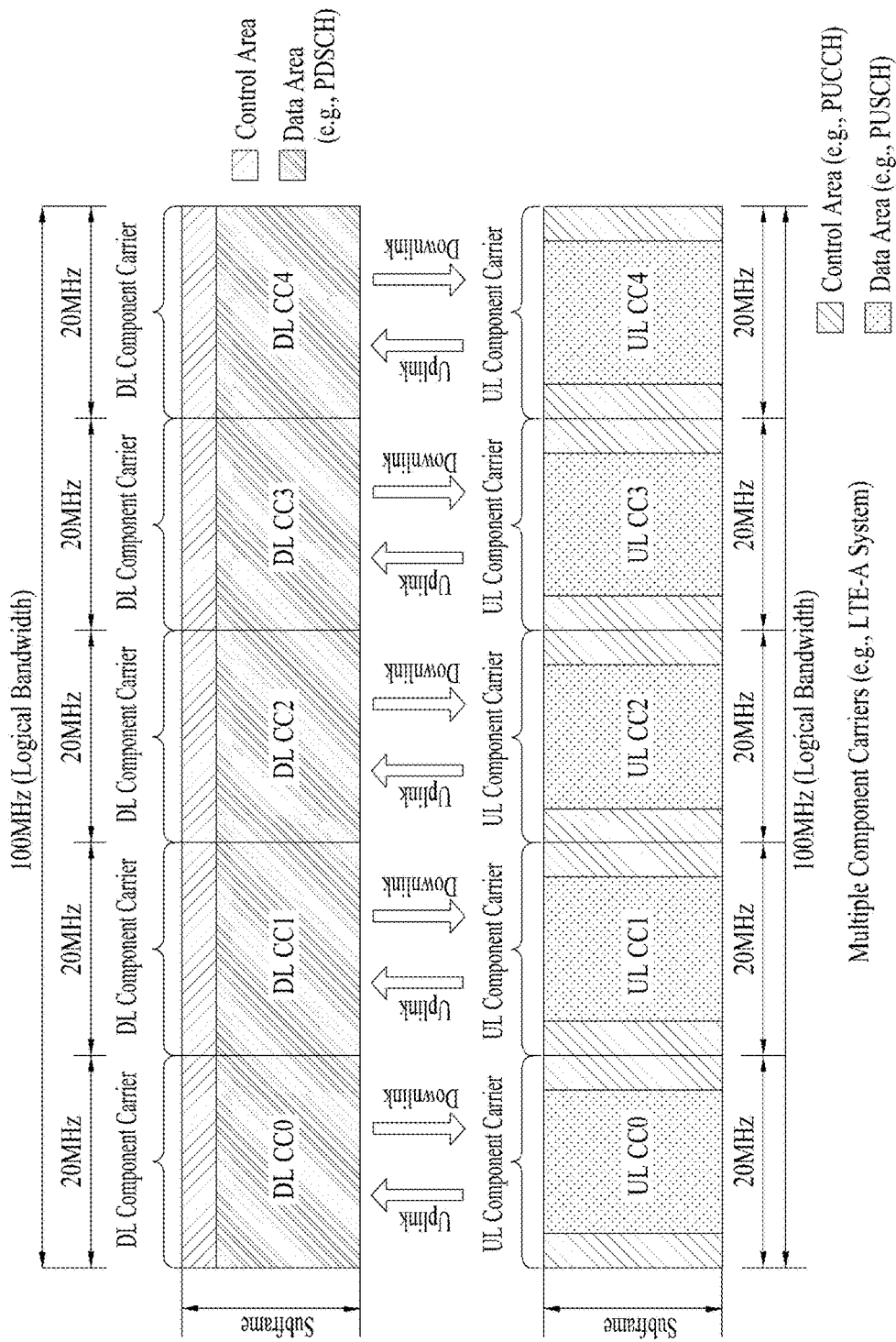
FIG. 12 exemplarily shows a carrier aggregation (CA) communication system.

FIG. 12 exemplarily shows a carrier aggregation (CA) communication system.

Referring to FIG. 12, a plurality of UL/DL component carriers (CCs) can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. Control information may be transmitted/received only through a specific CC. This specific CC may be referred to as a primary CC and other CCs may be referred to as secondary CCs. For example, when cross-carrier scheduling (or cross-CC scheduling) is applied, a PDCCH for downlink allocation can be transmitted on DL CC #0 and a PDSCH corresponding thereto can be transmitted on DL CC #2. The term "component carrier" may be replaced by other equivalent terms (e.g. "carrier", "cell", etc.).

For cross-CC scheduling, a carrier indicator field (CIF) is used. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.
No CIF
CIF enabled: a PDCCH on a DL CC can be used to allocate a PDSCH or PUSCH resource on a specific DL/UL CC from among a plurality of aggregated DL/UL CCs using the CIF.
LTE DCI format extended to have CIF
CIF corresponds to a fixed x-bit field (e.g. x=3) (when CIF is set)
CIF position is fixed irrespective of DIC format size (when CIF is set)

When the CIF is present, the BS may allocate a monitoring DL CC (set) to reduce BD complexity of the UE. For PDSCH/PUSCH scheduling, the UE may detect/decode a PDCCH only on the corresponding DL CCs. The BS may transmit the PDCCH only through the monitoring DL CC (set). The monitoring DL CC set may be set UE-specifically, UE-group-specifically or cell-specifically.

Figure 13:
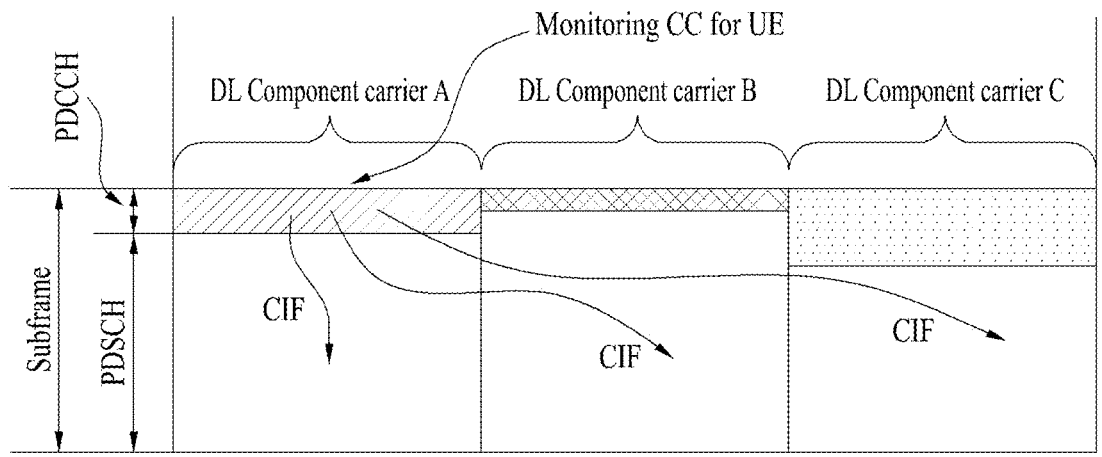
FIG. 13 exemplarily shows a scheduling when a plurality of carriers are aggregated.

FIG. 13 illustrates scheduling when a plurality of carriers is aggregated. It is assumed that 3 DL CCs are aggregated and DL CC A is set to a PDCCH monitoring DL CC. DL CC A, DL CC B and DL CC C can be called serving CCs, serving carriers, serving cells, etc. In case of CIF disabled, a DL CC can transmit only a PDCCH that schedules a PDSCH corresponding to the DL CC without a CIF (non-cross-CC scheduling). When the CIF is enabled according to UE-specific (or UE-group-specific or cell-specific) higher layer signaling, DL CC A (monitoring DL CC) can transmit not only a PDCCH that schedules the PDSCH corresponding to the DL CC A but also PDCCHs that schedule PDSCHs of other DL CCs (cross-CC scheduling). In this case, DL CC B and DL CC C that are not set to a PDCCH monitoring DL CCs do not deliver PDCCHs.

Meanwhile, since a millimeter wave (mmW) has a short wavelength of a signal, it is possible to install a multitude of antennas in the same area. For example, since a wavelength on a band of 30 GHz is 1 cm for example, it is possible to install total 100 antenna elements in 2-dimensional array having an interval of 0.5λ (wavelength) on a 5-cm panel. Hence, in a mmW system, using a multitude of antenna elements, it is intended to increase coverage by raising a beamforming (BF) gain or increase throughput.

Regarding this, if a TXRU (transceiver unit) is provided to enable transmission power and phase adjustments per antenna element, independent beamforming can be performed per frequency resource. Yet, it is ineffective to install TXRU at each of 100 antenna elements in aspect of price. Thus, a method of mapping a multitude of antenna elements to a single TXRU and adjusting a direction of a beam is taken into consideration. Since such an analog beamforming scheme can make a single beam direction only on full bands, it is disadvantageous in that a frequency selective beam cannot be provided. It is able to consider hybrid BF, which has B TXRUs smaller than Q antenna elements, in an intermediate form between digital BF and analog BF. In this case, although there are differences depending on a scheme of connection between the B TXRUs and the Q antenna elements, the number of directions of simultaneously transmittable beams is limitedly equal to or smaller than B.

Figure 14:
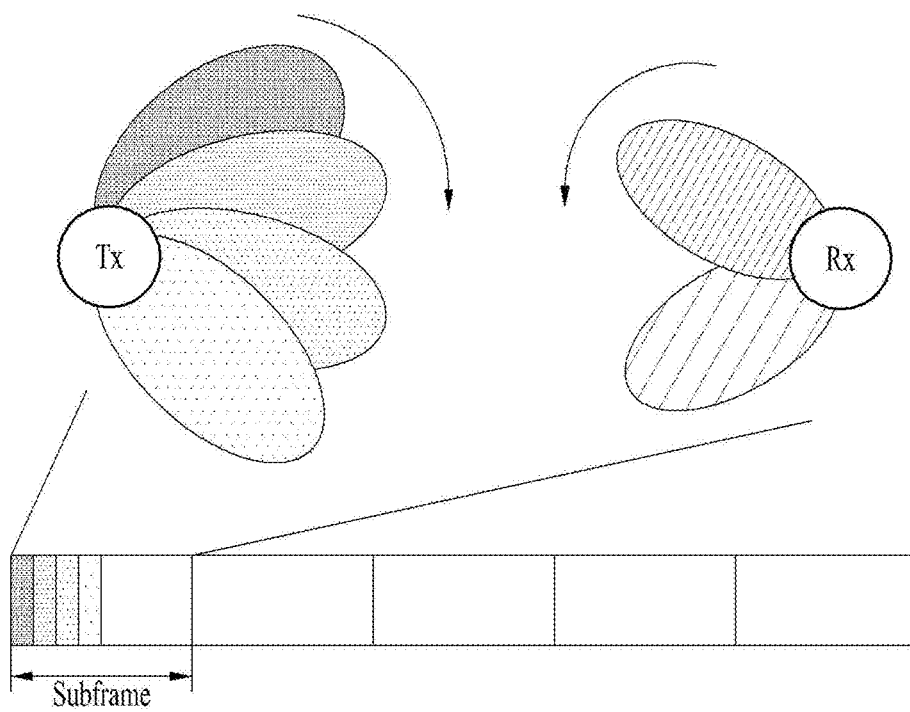
FIG. 14 exemplarily shows analog beamforming.

FIG. 14 exemplarily shows analog beamforming. Referring to FIG. 14, a transmitter can transmit a signal by changing a direction of beam according to time [transmission (Tx) beamforming], and a receiver can receive a signal by changing a direction of beam according to time as well [reception (Rx) beamforming]. In a predetermined time interval, (i) Tx beam and Rx beam simultaneously change beam directions according to time, (ii) a direction of Rx beam is changed according to time while Tx beam is fixed, or (iii) a direction of Tx beam is changed according to time while Rx beam is fixed.

Figure 15:
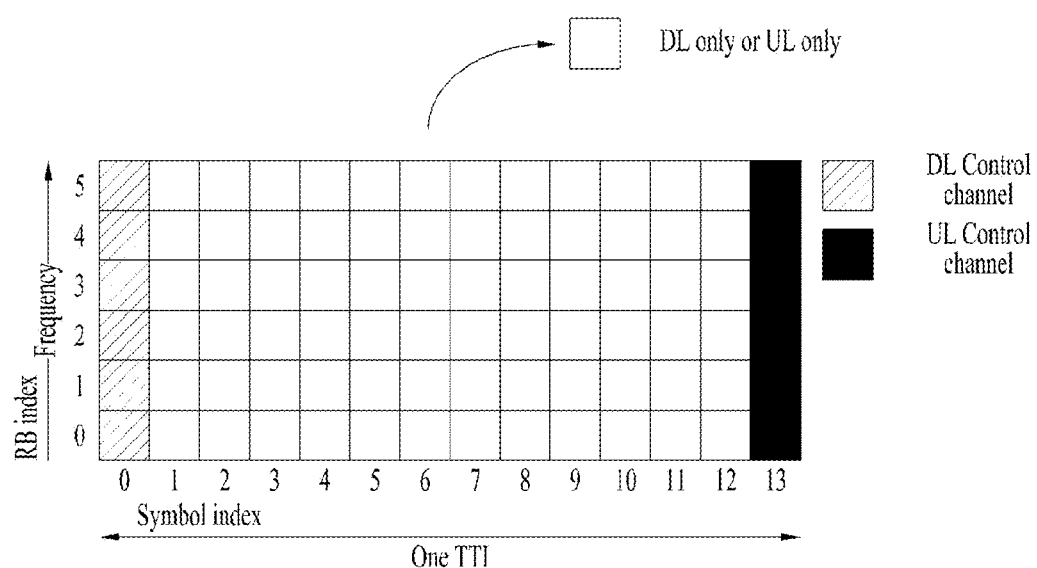
FIG. 15 exemplarily shows a structure of a self-contained subframe.

Meanwhile, in the next generation RAT (Radio Access Technology), a self-contained subframe is taken into consideration to minimize data transmission latency. FIG. 15 exemplarily shows a structure of a self-contained subframe. In FIG. 15, a hatched region indicates a DL control region and a black part indicates a UL control region. A mark-free region may be usable for DL or UL data transmission. Since DL transmission and UL transmission sequentially progress in a single subframe, DL data can be sent in the subframe and UL ACK/NACK can be received in the subframe. Since a time taken to data retransmission in case of data transmission error occurrence is reduced, delivery latency of final data can be minimized.

As examples of a configurable/settable self-contained subframe type, 4 kinds of subframe types can be considered. The respective intervals are listed in order of time.
DL control interval+DL data interval+GP(Guard Period)+UL control interval
DL control interval+DL data interval
DL control interval+GP+UL data interval+UL control interval
DL control interval+GP+UL data interval In DL control interval, PDFICH, PHICH and PDCCH can be transmitted. In DL data interval, PDSCH can be transmitted. A GP provides a time gap in a process for a BS and UE to switch to an Rx mode from a Tx mode, and vice versa. Some OFDM symbols of a timing of switching to UL from DL in a subframe may be set as a GP.

EXAMPLE

In case of an existing LTE system, if a size (i.e., TBS) of DL data becomes equal to or greater than a predetermined level, a bitstream (i.e., TB) to be transmitted on PDSCH is partitioned into a plurality of CBs and channel coding and CRC are applied per CB [cf. FIG. 9]. If failing in receiving (i.e., decoding) any one of a plurality of CBs included in a single TB, a UE reports HARQ-ACK feedback (e.g., NACK) corresponding to the TB to a BS. Through this, a BS retransmits all CBs corresponding to the TB. So to speak, an HARQ operation for DL data in the existing LTE/LTE-A is performed based on scheduling/transmission in unit of TB from the BS and HARQ-ACK feedback configuration in unit of TB, which corresponds to the scheduling/transmission from the UE.

Meanwhile, a next generation RAT (hereinafter, a new RAT) system can basically have a system (carrier) BW (bandwidth) wider than that of LTE, whereby it is highly probable that TBS (or, maximum TBS) becomes greater than that of LTE. Hence, the number of CBs configuring a single TB may become greater than that of LTE. Hence, if HARQ-ACK feedback in TB unit is performed in the new RAT system like the existing system, although decoding error (i.e., NACK) is generated for a small number of CBs only, retransmission scheduling is accompanied in unit of TB. Hence, resource use efficiency may be lowered. Moreover, in the new RAT system, through some (symbols) of resources allocated to transmission of a delay-insensitive data type 1 (e.g., enhanced mobile broadband (eMBB)) having a big time interval (TTI), a delay-sensitive data type 2 (e.g., ultra-reliable low latency communications (URLLC)) having a small TTI can be transmitted in a manner of puncturing the data type 1. By including this, it may happen that decoding error (i.e., NACK) is concentrated on specific portions of a plurality of CBs configuring a single TB for the data type 1 due to the influence of an interference signal having time-selective characteristics.

The present invention proposes a method of performing (retransmission) scheduling in unit of CB or CBG (CB group) and configuring/transmitting HARQ-ACK feedback in unit of CB/CBG, in consideration of properties of a new RAT system. Particularly, the present invention proposes a method of configuring CBG, a method of configuring HARQ-ACK (hereinafter abbreviated A/N) feedback, a method of operating a reception soft buffer of a UE, a method of handling a specific mismatch situation, and the like.

For clarity, the proposed methods of the present invention are sorted into various embodiments, which are usable by being combined together.

Abbreviations/terms used in the present invention are described as follows.

TBS: TB size. Total number of bits configuring TB
CB: Code block
CB size: Total number of bits configuring CB
CBG: Code block group. All CBs (configuring a single TB) may be configured as a single CBG, some of a plurality of CBs may be configured as a single CBG, or each CB may be configured as a single CBG.
A/N: HARQ-ACK response. Namely, this may mean ACK, NACK, or DTX. DTX indicates a case of missing a PDCCH. A/N bit may be set to 1 in case of ACK, or set to 0 in case of NACK. This may be used equivalent to HARQ-ACK or ACK/NACK.
CBG-based A/N: Since CRC is not attached to CBG, it is able to generate A/N based on error check result(s) of CB(s) in CBG. For example, if all CBs in CBG are successfully detected, a UE sets A/N response (or A/N bit) for CBG to ACK. If any one of CBs in CBG is not successfully detected, a UE may set A/N response (or A/N bit) for CBG to NACK [logical AND]. A/N payload for CBG(s) of TB includes a plurality of A/N (response) bits, and each A/N (response) bit corresponds to CBG of TB by 1:1.
CBG-based retransmission: TB retransmission can be performed in unit of CBG in response to CBG-based A/N. For example, in case of retransmitting TB to a UE, a BS can perform a retransmission of CBG for which NACK is received from a UE. In doing so, in case of a retransmission of a TB corresponding to the same HARQ process as a previous transmission of the TB, CB(s) in CBG is maintained identical to that in case of an initial transmission of the TB.
CBG size: The number of CBs configuring CBG
CBG index: Index for identifying CBG. According to a context, CBG index is equivalently usable as CBG having the corresponding index.
Symbol: This may mean OFDMA symbol or SC-FDMA symbol unless distinguished separately.
floor(X): Descending function. This means a maximum integer equal to or smaller than X.
ceiling(X): Ascending function. This means a minimum integer equal to or greater than X.
mod(A, B): This means a remainder resulting from dividing A by B.

(X) Method of Configuring CB

1) Method X-1: If the bit number 'Cn' configuring a single CB is given, Cm CBs are configured based on the bit number 'Cn'.

The bit number Cn configuring a single CB may be predefined as a single same value irrespective of TBS or different values per TBS (e.g., values proportional to TBS), or indicated to a UE through semi-static signaling (e.g., RRC signaling) or dynamic signaling (e.g., DCI). Hence, when the total bit number configuring TB is Ck, it is able to configure CBs, of which number is Cm=floor(Ck/Cn) or Cm=ceiling(Ck/Cn). In the former case, one CB may be configured with (Cn+mod(Ck, Cn)) bits, and each of the rest of (Cm−1) CBs may be configured with Cn bits. In the latter case, one CB may be configured with mod(Ck, Cn) bits, and each of the rest of (Cm−1) CBs may be configured with Cn bits. In the former case, Cn may mean a minimum bit number configuring one CB. In the latter case, Cn may mean a maximum bit number configuring one CB.

As another method, it is able to apply a method of assigning the bit number per CB to all CBs near-equally. Let's take the foregoing case as an example. In case that Cm (=floor(Ck/Cn)) CBs are configured, mod(Ck, Cn) CBs can be configured with (Cn+1) bits and the rest of CBs can be configured with Cn bits. Moreover, in case that Cm (=ceiling (Ck/Cn)) CBs are configured, (Cn−mod(Ck, Cn)) CBs can be configured with (Cn−1) bits and the rest of CBs can be configured with Cn bits. In the former case, Cn may mean a minimum bit number configuring one CB. In the latter case, Cn may mean a maximum bit number configuring one CB.

Meanwhile, if the above method is applied, at least one specific CB (hereinafter, a small CB) among total Cm CBs can be configured with the small number of bits less than the rest of other CBs (hereinafter, regular CB). Hence, a scheme of grouping Cm CBs having unequal sizes into a plurality of CBGs (e.g., M CBGs) may be necessary. Particularly, there may be a case that the total CB number 'Cm' becomes a multiple of the CBG number 'M' and a case that the total CB number 'Cm' does not become a multiple of the CBG number 'M'. For each of such cases, the following CB grouping schemes can be considered. In the following, a CBG size may mean the number of CB(s) per CBG. Meanwhile, if Cm is not a multiple of M, a size may differ per CBG. And, a size difference between CBGs may be limited to max 1 CB.

A. Case that Cm is a multiple of M (All CBGs in equal size)
  Opt 1-1: Small CB configured to be distributed to as many CBGs as possible
  Opt 1-2: small CB configured to belong to as few CBGs as possible
B. Case that Cm is not a multiple of M (Size may differ per CBG.)
  Opt 2-1: Small CB configured to belong to CBG as large as possible
  Opt 2-2: Small CB configured to belong to CBG as small as possible
  Opt 2-3: Opt 1-1 or Opt 1-2 applied For one example, when Cm=7, in a situation that CB indexes 1/2/3/4/5/6/7 are configured with 5/5/5/5/5/5/2 bits, respectively, it is able to consider M (=3) CBG configurations. Here, if Opt 2-1 is applied, CB indexes {1, 2}, {3, 4}, and {5, 6, 7} can be configured with CBG indexes 1/2/3, respectively. If Opt 2-2 is applied, CB indexes {1, 2, 3}, {4, 5}, and {6, 7} can be configured with CBG indexes 1/2/3, respectively. For another example, when Cm=7, in a situation that CB indexes 1/2/3/4/5/6/7 are configured with 5/5/5/5/4/4/4 bits, respectively, it is able to consider M (=3) CBG configurations. Here, if Opt 2-1 is applied, CB indexes {1, 2}, {3, 4}, and {5, 6, 7} can be configured with CBG indexes 1/2/3, respectively. If Opt 2-2 is applied, CB indexes {1, 2, 3}, {4, 5}, and {6, 7} can be configured with CBG indexes 1/2/3, respectively. On the other hand, if Opt 1-1 is applied, CB indexes {1, 2, 5}, {3, 6}, and {4, 7} can be configured with CBG indexes 1/2/3, respectively. If Opt 1-2 is applied, CB indexes {1, 2}, {3, 4}, and {5, 6, 7} can be configured with CBG indexes 1/2/3, respectively.

Additionally, if CBG corresponding to a part possibly having low decoding reliability is configured to include CBs as small as possible, it is able to reduce a size of CBG having high retransmission probability if possible. For example, a case of possibly low decoding reliability may include a case that a CB size of a radio signal is relatively small, a case that a radio signal is far from DMRS on a time axis, a case that a radio signal is far from a CSI feedback timing, or a case that a radio signal is mapped to (OFDMA/SC-FDMA) symbol adjacent to SRS (or, PUCCH, PRACH). To this end, CBG can be configured as follows.

a) A regular CB begins to be configured in a unit of X-bit by starting with a low CB index, and a small CB then begins to be configured in a unit of Y-bit by starting with a specific CB index (Y<X).

b) A regular CB begins to be configured by making a bundle of a unit of M CBs by starting with a low CBG index (sequentially from a CB of a low CB index), and a small CB then begins to be configured by making a bundle of a unit of K CBs by starting with a specific CBG index (K<M). Here, as proposed in the foregoing description, a size difference between CBGs may be limited to max 1 CB (e.g., M=K+1). According to a) and b), compared with CBG of a lower index, CBG of a higher index may have a relatively small size or include more small CBs despite having the same CBG size.

c) CBGs are mapped by frequency-first (or, time-first)) scheme sequentially from a low CBG index. Here, compared to CBG of a higher index, CBG of a lower index may be mapped to a resource having relatively high decoding reliability.

Meanwhile, in case of 'Cn>Ck', all bits of TB are configured with a single CB. And, a CB including Ck bits can be configured.

2) Method X-2: If the total CB number 'Cm' is given, each CB is configured by Cn-bit unit based on Cm.

The total CB number 'Cm' may be predefined as the same single value irrespective of TBS or values different per TBS (e.g., values proportional to TBS), or indicated to a UE through semi-static signaling (e.g., RRC signaling) or dynamic signaling (e.g., DCI). For example, if the total bit number configuring TB is Ck, each CB can be configured by unit of Cn (=floor(Ck/Cm)) bits or Cn (=ceiling(Ck/Cm)) bits. In the former case, only one CB can be configured with (Cn+mod(Ck, Cn)) bits and each of the rest of (Cm−1) CBs can be configured with Cn bits. In the latter case, only one CB can be configured with mod(Ck, Cn) bits and each of the rest of (Cm−1) CBs can be configured with Cn bits. In the former case, Cn may mean the minimum bit number configuring one CB. In the latter case, Cn may mean the maximum bit number configuring one CB.

As another method, it is able to apply a scheme of assigning the bit number per CB to all CBs near-equally. Let's take the foregoing case as one example. If CB is configured by unit of Cn (=floor(Ck/Cm)) bits, mod(Ck, Cm) CBs are configured with (Cn+1) (or, ceiling(Ck/Cm)) bits and the rest of (Cm−mod(Ck, Cm)) CBs can be configured with Cn bits. If CB is configured by unit of Cn (=ceiling(Ck/Cm)) bits, (Cm−mod(Ck, Cm)) CBs are configured with (Cn−1) (or, floor(Ck/Cm)) bits and the rest of mod(Ck, Cm) CBs can be configured with Cn bits. In the former case, Cn may mean the minimum bit number configuring one CB. In the latter case, Cn may mean the maximum bit number configuring one CB.

3) Method X-3: If the minimum bit number 'Tm' configuring one CB is given, CB is configured based on Tm.

Every CB configuring one TB may be set to be configured with at least Tm bits. For example, if TBS is assumed with Ck, a maximum Cm value 'Cm.max' meeting the relation 'Ck/Cm>Tm' is calculated and an operation of segmenting the corresponding TB into Cm.max CBs can be considered.

4) Method X-4: If the CB number is equal to or greater than a specific level, CB-unit scheduling and grouping between plural CBs are performed.

Only if the total CB number 'K' configuring one TB is equal to or greater than Ts, CB- or CBG-unit (retransmission) scheduling can be set/defined to be applied to the corresponding TB. Moreover, if the total CB number 'K' is equal to or greater than Tg, a plurality of CBs can be set/defined to be grouped to configure one CBG (e.g., Ts<Tg). Here, the bit number Cn configuring one CB may be predefined or given through specific signaling (e.g., RRC signaling, DCI).

(A) Method of Configuring CBG

1) Method A-1: if the CB Number 'N' Configuring a Single CBG is Given, M CBGs are Configured Based on the CB Number 'N'.

The CB number 'N' configuring a single CB may be predefined as a single same value irrespective of TBS or different values per TBS (e.g., values proportional to TBS), or indicated to a UE through semi-static signaling (e.g., RRC signaling) or dynamic signaling (e.g., DCI). For example, when the total CB number configuring TB is K, it is able to configure CBGs, of which number is M=floor(K/N) or M=ceiling(K/N). In the former case, one CBG may be configured with (N+mod(K, N)) CBs, and each of the rest of (M−1) CBGs may be configured with N CBs. In the latter case, one CBG may be configured with mod(K, N) CBs, and each of the rest of (M−1) CBGs may be configured with N CBs. In the former case, N may mean a minimum CB number configuring one CBG. In the latter case, N may mean a maximum CB number configuring one CBG. Meanwhile, a UE can configure and transmit A/N bit per CBG.

As another method, it is able to apply a method of assigning the CB number per CBG to all CBGs near-equally. Let's take the foregoing case as an example. In case that M (=floor(K/N)) CBGs are configured, (N−mod(K, N)) CBGs can be configured with (N+1) CBs and the rest of CBs can be configured with N CBs. Moreover, in case that M (=ceiling(K/N)) CBGs are configured, (N−mod(K, N)) CBGs can be configured with (N−1) CBs and the rest of CBGs can be configured with N CBs. In the former case, N may mean a minimum CB number configuring one CBG. In the latter case, N may mean a maximum CB number configuring one CBG Meanwhile, if N>K, all CBs configuring TB belong to a single CBG and one CBG including K CBs can be configured.

2) Method A-2: if the Total CBG Number 'M' is Given, Each CBG is Configured in a Unit of N-CBs Based on M.

The total CBG number 'M' may be predefined as the same single value irrespective of TBS or as a different value per TBS (e.g., a value proportional to TBS), or indicated to a UE through semi-static signaling (e.g., RRC signaling) or dynamic signaling (e.g., DCI). A UE can identify/configure CBG from CBs of TB based on the total CBG number 'M'. For example, if the total CB number configuring TB is K, each CBG can be configured in a unit of N (=floor(K/M)) or N (=ceiling(K/M)) CBs. In the former case, only one CB can be configured with (N+mod(K, N)) CBs and each of the rest of (M−1) CBGs can be configured with N CBs. In the latter case, only one CB can be configured with mod(K, N) CBs and each of the rest of (M−1) CBGs can be configured with N CBs. In the former case, N may mean the minimum CB number configuring one CBG. In the latter case, N may mean the maximum CB number configuring one CBG. Meanwhile, a UE can configure and transmit M A/N bits for a TB, and each of the A/N bits may indicate an A/N result for a corresponding CBG.

As another method, it is able to apply a scheme of assigning the CB number per CBG to all CBGs near-equally. Let's take the foregoing case as one example. In case of CBG configuration by unit of N (=floor(K/M)) CBs, mod(K, M) CBGs are configured with (N+1) (or, ceiling(K/M)) CBs and the rest of (M−mod(K, M)) CBGs can be configured with N (or floor(K/M)) CBs. In case of CB configuration by unit of N (=ceiling(K/M)) CBs, (M−mod(K, M)) CBGs can be configured with (N−1) (or, floor(K/M)) CBs and the rest of mod(K, M) CBGs can be configured with N (or, ceiling (K/M)) CBs. In the former case, N may mean the minimum CB number configuring one CBG. In the latter case, N may mean the maximum CB number configuring one CBG.

Meanwhile, if M>K, as each CB becomes one CBG, total K CBGs can be configured. In this case, it is able to consider a scheme 1) that in a state that total A/N feedback is configured with M bits, (M−K) bits not corresponding to actual CBG(s) are processed as NACK or DTX, or a scheme 2) that A/N feedback itself is configured with K bits corresponding to actual CBGs.

Figure 16:
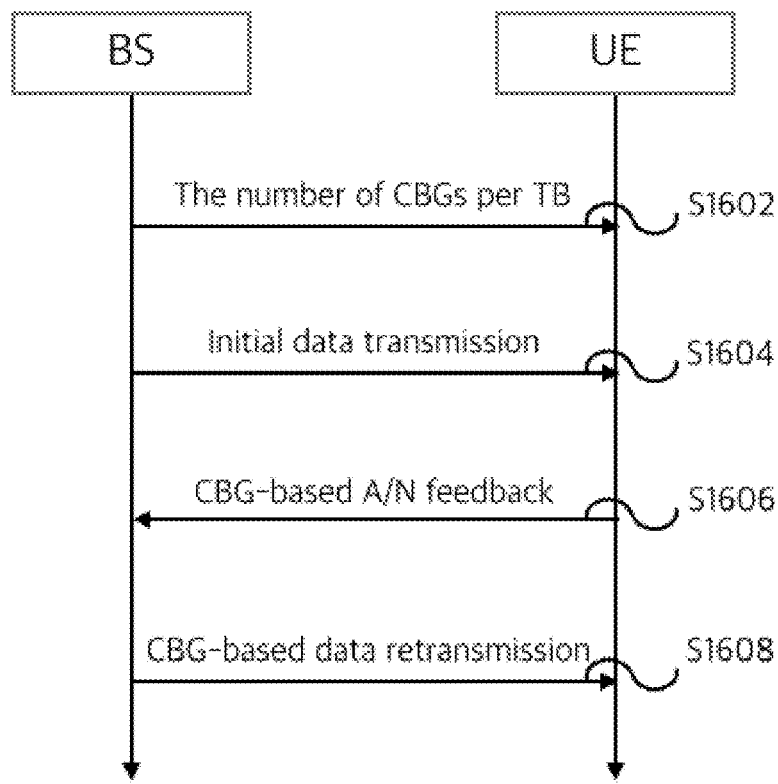
FIG. 16 and FIG. 17 exemplarily show signal transmissions according to the present invention.
Figure 16:
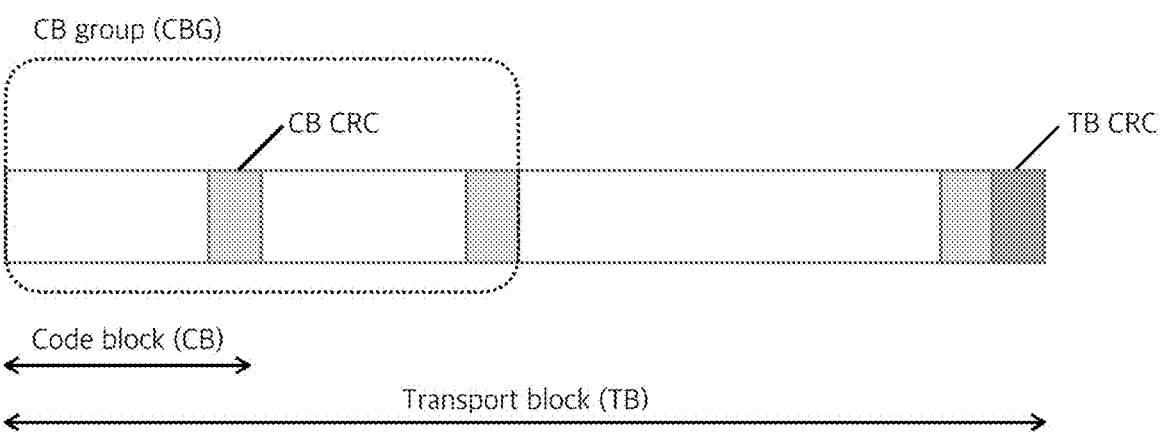

FIG. 16 shows a signal transmitting process according to the present invention.

Referring to FIG. 16, a UE can receive information on the number M of code block groups per transport block through upper layer signaling (e.g., RRC signaling) from a BS [S1602]. Thereafter, the UE can receive initial transmission of data from the BS (on PDSCH) [S1604]. Here, the data include a transport block, the transport block includes a plurality of code blocks, and a plurality of the code blocks can be grouped into one or more code block groups. Here, some of the code block groups may include ceiling (K/M) code blocks and the rest of code block groups may include flooring (K/M) code blocks. K indicates the number of code blocks in the data. Thereafter, the UE can feed back CBG-based (code block group-based) A/N information on the data to the BS [S1606], and the BS can perform data retransmission based on the code block group [S1608]. The A/N information can be transmitted on PUCCH or PUSCH. Here, the A/N information includes a plurality of A/N bits for the data, and each of the A/N bits can indicate each A/N response, which is generated in unit of code block group, for the data. A payload size of the A/N information can be identically maintained based on M irrespective of the number of code block groups configuring the data.

3) Method A-3: CBG Configuration Based on a Tree (or Nested) Structure for the CBG Number 'M' and the CBG Size 'N'

CBG can be configured to have a tree structure for the total CBG number 'M' (e.g., M1, M2 . . . ) and the CBG size 'N' (e.g., N1, N2 . . . ). In this case, a plurality of different CBG configurations based on a plurality of different (M, N) combinations can be set for one TB (size). Considering CBG configuration in case of (M1, N1) and CBG configuration in case of (M2, N2) for the different (M, N) combinations, if M1<M2, it is able to set N1>N2. Moreover, one CBG in case of (M1, N1) can be configured to include at least one CBG in case of (M2, N2). On the contrary, one CBG in case of (M2, N2) can be configured to belong to a specific CBG in case of (M1, N1) only. Moreover, M2 may be set to a multiple of M1 or/and N1 may be set to a multiple of N2. M may be set to $2^m$ (m=0, 1 . . . ). Meanwhile, an index for M, N or (M, N) combination or one (or more) of CBG indexes available with reference to all (M, N) combinations can be indicated to the UE through semi-static signaling (e.g., RRC signaling) or dynamic signaling (e.g., DCI). The UE can configure and transmit A/N bits per CBG configured to correspond to the corresponding index. M and N may be predefined as a same single value irrespective of TBS or predefined as values per TBS (e.g., values proportional to TBS).

For example, while the total CB number configuring TB is assumed as K=16 and each CB is indexed into k=0, 1 . . . 15, it is able to consider a scheme of setting the CBG number to M={1, 2, 4, 8, 16} and setting each corresponding CBG size to N=K/M={16, 8, 4, 2, 1} [nested CBG example 1].

a) If (M, N)=(1, 16), 1 CBG is configured only and the corresponding CBG includes 16 CBs all.

b) If (M, N)=(2, 8), 2 CBGs are configured and each CBG includes different 8 CBs. In this case, one CBG includes 2 CBGs of the case of (M, N)=(4, 4).

c) If (M, N)=(4, 4), 4 CBGs are configured and each CBG includes different 4 CBs. In this case, one CBG includes 2 CBGs of the case of (M, N)=(8, 2).

d) If (M, N)=(8, 2), 8 CBGs are configured and each CBG includes different 2 CBs.

e) If (M, N)=(16, 1), 16 CBGs are configured and each CBG includes different 1 CB only.

Like the above example, one (or more) of an index of a specific M, a specific N or an (M, N) combination in a state that a plurality of different (M, N) combinations and the CBG number/size according to the different (M, N) combinations are configured/designated in advance and a CBG index available with reference to all (M, N) combinations can be indicated to a UE. In the above example, there are total 5 kinds of the available M, N and (M, N) combinations and total 32 kinds of CBS indexes (corresponding to the sum of available M values {1, 2, 4, 8, 16}) are set for all the (M, N) combinations. The UE can perform the decoding and the corresponding A/N feedback configuration/transmission in a state that CBG configuration corresponding to the M and/or N index for the scheduled DL data (e.g., TB or CBG).

By generalizing the present method, for the CBS configuration of a case of (M1, N1) and (M2, N2) corresponding to the different (M, N) combinations, on the condition that N1≥N2 is set if M1<M2, a plurality of CBG configurations can be set for one TB (size). For example, assuming that the total CB number configuring TB is K=6, in a state that each CB is indexed with k=0, 1 . . . 5, it is able to consider a scheme of setting the CBG number to M={1, 2, 3, 6} and setting a CBG size corresponding to each CBG number to N=K/M={6, 3, 2, 1} [nested CBG example 2].

a) If (M, N)=(1, 6), only 1 CBG is configured and the corresponding CBG includes 6 CBs all.

b) If (M, N)=(2, 3), 2 CBGs are configured and each CGB includes different 3 CBs. For example, each of the CB index sets configures 1 CGB.

c) If (M, N)=(3, 2), 3 CBGs are configured and each CGB includes different 2 CBs. For example, each of the CB index sets {0, 1}, {2, 3} and {4, 5} configures 1 CBG.

d) If (M, N)=(6, 1), 6개 CBGs are configured and each CBG includes different 1 CB only.

For another example, assuming that the total CB number configuring TB is K=9, in a state that each CB is indexed with k=0, 1 . . . 8, it is able to consider a scheme of setting the CBG number to M={1, 2, 3, 6} and setting a CBG size corresponding to each CBG number to N={9, (5 or 4), 3, (2 or 1)} [nested CBG example 3].

a) If (M, N)=(1, 9), 1 CBG is configured only and the corresponding CBG includes 9 CBs all.

b) If (M, N)=(2, 5 or 4), total 2 CBGs are configured. One CBG includes 5 CBs and the other CBG includes 4 CBs. For example, each of CB index sets {0, 1, 2, 3, 4} and {5, 6, 7, 8} configures one CBG.

c) If (M, N)=(3, 3), 3 CBGs are configured and each CBG includes different 3 CBs. For example, each of CB index sets {0, 1, 2}, {3, 4, 5} and {6, 7, 8} configures one CBG.

d) If (M, N)=(6, 2 or 1), total 6 CBGs are configured. Each of 3 CBGs among the 6 CBGs includes 2 CBs and each of the other 3 CGBs includes 1 CB. For example, each of the CB index sets {0, 1}, {2, 3}, {4, 5}, {6}, {7}, and {8} configures one CGB.

In case of the nested CBG example 2/3, the configured total 12(=1+2+3+6) CBGs (based on 4 kinds of different (M, N) combinations) can be indexed. Based on this, a BS indicates a retransmission scheduled CBG (through DCI) or/and a UE can configure and transmit A/N feedback for the indicated CBG.

Meanwhile, by considering a DCI overhead for scheduling target CBG indication and/or a UCI overhead for corresponding A/N feedback configuration, the total CBG index number L configured in the nested form may be set equal per TBS or a per-TBS L value may be set to enable a bit overhead for CBG indication to be equal per TBS (i.e., to enable a value of ceiling(log$_2$ (L)) to be set equal).

4) Method A-4: Configuring CBs Belonging to a Specific Number of Symbol Sets (and a Specific Number of RB Sets) as One CBG In a state that a TB transmitted time interval (and/or a frequency region) is partitioned into a plurality of symbol sets (hereinafter, a symbol group (SG)) (and/or a plurality of RB sets (hereinafter, RB Group (RBG)), CBs transmitted through each SG (and/or each RBG) may be configured as one CBG. In this case, information on the symbol number in each SG or the symbol number configuring a single SG (and/or the RB number in each RBG or the RB number configuring a single RBG) may be indicated to a UE through semi-static signaling (e.g., RRC signaling) or dynamic signaling (e.g., DVI). In case of receiving DL data, the UE can configure and transmit A/N bit per CBG.

Moreover, a scheme of configuring CBG to have the tree structure like the method A-3 for the symbol number configuring one SG or the total SG number configured within a TB transmission time interval (and/or the RB number configuring one RBG or the total RBG number configured within a TB transmission frequency region) is possible as well. On the basis of the nested CBG example 1/2/3, for example, assuming that the total symbol (or RB) number configuring TB is K=16, 6 or 9, each symbol (or RB) can be indexed with k=0~15, k=0~5 or k=0~8. In this state, a plurality of SGs (or RBGs) mutually having the nested structure relation can be configured in form similar to the nested CBG example 1/2/3. Moreover, the SG (and/or RBG) size/number may be predefined as a same single value irrespective of TBS, or predefined as values different per TB (e.g., values proportional to TBS).

Meanwhile, if one CB is mapped/transmitted across a plurality of SGs (and/or RBGs), the corresponding CB may be defined as: Opt 1) included in CBG corresponding to SG having a lowest or highest symbol index (and/or RBG having a lowest or highest RB index); or Opt 2) as included in CBG corresponding to SG (and/or RBG) including the coded bits of the corresponding CB as many as possible.

As another method, if one CB is mapped/transmitted across a plurality of SGs (and/or RBGs), the corresponding CB can be set as included in all of a plurality of CBGs corresponding to a plurality of the corresponding SGs (or RGBs) in aspect of CBG configuration/indication for (re-transmission) scheduling in a BS. On the other hand, in aspect of A/N feedback configuration per CBG in a UE, in a state that the corresponding CB is included in a CBG corresponding to a specific one of a plurality of the corresponding SGs (or RBGs) only, the UE can operate to configure and transmit A/N bit per CBG. In this case, the UE can select the specific CBG having the corresponding CB included therein (in case of A/N feedback configuration) as follows.

1) When a decoding result of the corresponding CB is NACK, if there exists a CBG having a CB of NACK included therein despite excluding the corresponding CB (among all of a plurality of CBGs including the corresponding CB in aspect of scheduling), one (based on Opt 1/2 application) of such CBGs is selected. If such CBG does not exist, one (based on Opt 1/2 application) of all of a plurality of the CBGs (including the corresponding CB in aspect of scheduling) can be selected.

2) When a decoding result of the corresponding CB is ACK, one (based on Opt 1/2 application) of all of a plurality of the CBGs (including the corresponding CB in aspect of scheduling) can be selected.

Meanwhile, if a plurality of CBGs including a same CB are simultaneously scheduled, the corresponding CB can operate to be transmitted once only. For example, the corresponding CB may be transmitted in a manner of being included in a specific one (based on Opt 1/2 application) of a plurality of the corresponding CBGs.

By generalizing the above scheme, if one CB is set to be included in a plurality of CBGs in common in aspect of CBG configuration/indication for scheduling of a BS and a UE operates to enable the corresponding CB to be included in a specific one of a plurality of the CBGs only in aspect of configuring A/N feedback per CBG, the proposed scheme is applicable. For example, when total K CBs are configured as M CBGs, all the CBGs can be set to equally include N (=ceiling (K/M)) CBs, which amount to the CB number per CBG. In this case, some CBGs among the M CBGs may be set to include a specific CB in common. For example, two random CBGs in a set of CBGs of which number is smaller than M may include one CB in common, and the number of CBs included in the two random CBGs may be total (M−mod(K, M)).

As another scheme, in order to prevent one CB from being mapped/transmitted across a plurality of SGs (and/or RBGs) or to enable the data bit number belonging to each CBG to match each other as equal as possible, the following method can be considered. Assuming that a scheduled TBS is A bits and that the SG or RBG (generalized as CBG) number allocated to the corresponding TBS is M, (A/M) data bits, ceiling(A/M) data bits, or floor(A/M) data bits can be allocated. Then, while the data bit number allocated per CBG is substituted with the bit number Ck corresponding to TBS in the method X-1/2/3, it is able to configure a plurality of CBs belonging to each CBG by applying the method X-1/2/3. Meanwhile, a coded bit for a single CBG may be mapped/transmitted on a single SG or RBG only.

Meanwhile, a scheme of changing the symbol number configuring one SG according to the symbol number allocated to data transmission and/or the RB number (or the TBS number) allocated thereto is possible. For example, (in order to equalize the CBG number if possible), the per-SG symbol number can be configured in proportion to the symbol number allocated to data transmission. Moreover, (in order to equalize a CBG size if possible), the per-SG symbol number can be configured in inverse proportion to the RB number (or the TBS number) allocated to data transmission. Similarly, a scheme of changing the RB number configuring one RBG according to the RB number allocated to data transmission and/or the symbol (or TBS) number allocated thereto. For example, (in order to equalize the CBG number if possible), the per-RBG RB number can be configured in proportion to the RB number allocated to data transmission. Moreover, (in order to equalize a CBG size if possible), the per-RBG RB number can be configured in inverse proportion to the RB number (or the TBS number) allocated to data transmission.

5) Method A-5: Configuring Total CBG Number 'M' and CBG Size 'N' Per TBS (M, N) combination for CBG configuration can be set (different) per TBS (differently). The DCI bit number for CBG indication in performing data scheduling and/or a UCI payload size for the corresponding A/N feedback configuration can be determined based on a maximum value M.max among M values set per TBS. For example, the CBG indication information and/or the A/N payload size can be set to M.max, ceiling(M.max/K), or ceiling($\log_2$ (M.max)) bits. Here, K may be a positive integer, e.g., K=2.

As an additional method, first of all, if a set of (M, N) sets to be applied per TBS is named a TBS-CBG table, it is able to consider a scheme of indicating one of a plurality of TBS-CBG tables to a UE through semi-static signaling (e.g., RRC signaling) or dynamic signaling (e.g., DCI) in a state that a plurality of the TBS-CBG tables are predefined/preset. In this case, the (M, N) combination corresponding to the same TBS may be configured differently between a plurality of the TBS-CBG tables. Hence, the UE determines the (M, N) combination corresponding to the TBS indicated through DL/UL scheduling DCI by referring to the indicated TBS-CBG table and is then able to operate to perform DL/UL data transmission/reception and A/N feedback transmission based on the determined (M, N) combination.

As another method, in a state that a total TBS set is divided into a plurality of TBS ranges, it is able to apply a CBG configuring method different per TBS range. For example, for TBS range 1, the CBG number 'M' is configured by the method A-1 or per TBS differently (or, the CBS size 'N' is configured equally). Yet, for TBS range 2, the CBG number 'M' can be configured equally by the method A-2 or per TBS. In this case, considering DCI overhead and/or UCI payload, the TBS range 2 can be configured with TBSs greater than TBSs belonging to the TBS range 1. As further method, the same CBG configuration (e.g., CBG number/size) is applied to each TBS range but the CBG number/size and the like can be configured differently between TBS ranges. For example, for each of the TBS ranges 1 and 2, the CBG number 'M' is configured equally by the method A-2 or per TBS but different M values can be set between the TBS range 1 and the TBS range 2. In this case, M of the TBS range 2 may be set to a value greater than M of the TBS range 1. For another example, for each of the TBS ranges 1 and 2, the CBG size 'N' is configured equally by the method A-1 or per TBS but different N values can be set between the TBS range 1 and the TBS range 2. In this case, N of the TBS range 2 may be set to a value greater than N of the TBS range 1.

6) Method A-6: Applying Interleaving Between CBs Belonging to the Same CBG Before Data-to-Resource Mapping By considering influence of interference (e.g., URLLC puncturing operation) having a specific (time-selective) pattern, inter-CB interleaving can be applied between a plurality of CBs (coded bits) belonging to the same one CBG before data-to-resource (e.g., RE) mapping. For example, for a plurality of CBs (coded bits) belonging to one CBG, 1) inter-CB interleaving can be applied additionally in a state that intra-CB interleaving within each CB has been applied first, or 2) inter-CB interleaving can be applied in a state that intra-CB interleaving is omitted (if a CBG based HARQ operation is set). Here, the data-to-resource mapping includes RE mapping based on a frequency-first manner).

In all of the foregoing proposed methods, M, N and K may be set/indicated as the same value for each of different TBSs or different values for different TBSs, or set/indicated as the same value for a portion (e.g., N) according to TBS or different values for the rest (e.g., M and K). Moreover, considering a scheme of performing one DL data scheduling/transmission through a plurality of slots, one symbol group (SG) can be configured/set based on a slot in the foregoing proposed method (in this case, a symbol index is applied by being substituted with a slot index).

(B) HARQ-ACK Feedback Method

1) Method B-1: Configuring/Transmitting a (Minimum) Range Including all NACK on CBG Index as Feedback By considering a decoding error (i.e., NACK) across contiguous CBG indexes by time-selective interference in a state that a CBS configuration scheme (e.g., CBG number/size) is given, a UE can: 1) feed back a CBG index corresponding to a first NACK (on CBG index) and a CBG index corresponding to a last NACK to a BS, or 2) feed back a CBG index corresponding to a first NACK and a distance between the first NACK and a last NACK. Here, 1) and 2) can be signaled using an RIV (Resource Indication Value) indication scheme applied to UL resource allocation type 0 or a combinatorial index scheme applied to UL resource allocation type 1. In this case, a CBG configuration scheme may include the method A-1/2/3/4.

As an additional method, a UE directly selects one of a plurality of CBG configuration schemes (e.g., CBG number/size). Based on the selected CBG configuration, 1) the UE determines a (minimum) CBG range including NACK and then feeds back the corresponding NACK CBG range and the selected CBG configuration information to a BS, or 2) the UE configures an individual A/N bit per CBG and then feeds back the configured A/N bit to the BS (together with the selected CBG configuration information). In this case, a CBG configuration scheme may include the method A-1/2/3/4 as well.

Additionally, the above method is applicable to CBG scheduling from a BS. Particularly, 1) first and last CBG indexes to be transmitted (or retransmitted) or 2) the first CBS index and the total CBG number 'L' to be transmitted (or retransmitted) can be indicated through DL data scheduling DCI. In this case, a UE can operate (receive) in a state of assuming/regarding that 1) a CBG set corresponding to an index between indexes including the first and last CBG indexes or 2) a CBG set corresponding to contiguous L indexes including the first CBG index is scheduled.

2) Method B-2: Feeding Back CBG (of Minimum Size) Including all NACKs in CBG Configuration of the Tree Structure In a state that a plurality of CBG configurations (e.g., (M, N) combination) are given based on the tree structure like the method A-3, a UE can operate in a manner of selecting a specific CBG configuration, determining a CBG index including all NACKs based on the selected CBG configuration, and then feeding back the NACK CBG index and the selected CBG configuration information to a BS. Here, the NACK CBG is preferably selected as one CBG having a minimum size by including all NACKs. Namely, the UE can operate in a manner of selecting a specific CBG configuration, which enables a single CBG in minimum size to include all NACKs, from a plurality of CBG configurations having the tree structure, determining a CBG index including all NACKs based on the selected CBG configuration, and feeding back the determined CBG index to the BS (together with the selected CBG configuration information).

Similarly, in a state that a plurality of CBG configurations (based on different SG(/RBG) sizes/numbers) having the SG-based (and/or RBG-based) tree structure like the method A-4 are given, a UE may operate in a manner of selecting one CBG configuration based on specific SG(/RBG), determining a CBG index including all NACKs based on the selected CBG configuration, and feeding back the NACK CBG index and the selected CBG configuration (or a corresponding SB(/RBG) configuration) information to a BS together.

Additionally, the above method is applicable to CBG scheduling from the BS. Particularly, in a state that a plurality of CBG configurations (e.g., M and/or N (combination), or SG(/RBG) size/number) having the tree structure like the method A-3 or the method A-4 are given, one CBG index based on a specific CBG configuration can be indicated through DL data scheduling DCI. In this case, the UE can operate (receive) in a state of assuming/regarding that a CBG set belonging to the corresponding CBG index is scheduled through the corresponding DCI.

3) Method B-3: Maintaining CBG Configuration and Corresponding A/N Configuration Identically During One HARQ Process In order to prevent unnecessary DL data retransmission of RLC level due to A/N error of a specific CBG, CBG configuration (for retransmission (CBG) scheduling (indication) in a BS) and A/N feedback configuration corresponding to the CBG configuration can be maintained identically while one HARQ process is performed (i.e., until the process ends). Particularly, CBG configuration and a corresponding A/N feedback configuration, which are initially applied/indicated to DL data scheduling/transmission having a specific HARQ process ID, can operate to be maintained identically until the end of the corresponding HARQ process (e.g., until decoding of all CBs configuring TB of DL data succeeds, or before new DL data scheduling (NDI toggled) starts with the same HARQ process ID). Here, the initially applied/indicated CBG and A/N configuration information may be indicated to the UE through semi-static signaling (e.g., RRC signaling) or dynamic signaling (e.g., DCI, (initial) DL data scheduling DCI). If the initially applied/indicated CBG and A/N configuration information is indicated through semi-static signaling (e.g., RRC signaling), the CBG and A/N configuration information is fixed semi-statically and can be maintained identically in all HARQ processes until there is a new RRC signaling.

Meanwhile, a UE may configure and feed back A/N bit per CBG and operate to feedback NACK for a corresponding CBG (irrespective of a presence or non-presence of scheduling of the corresponding CBG) until succeeding in decoding of each CBG. And, the UE may operate to feed back ACK for the corresponding CBG from a timing of success in the decoding (irrespective of a presence or non-presence of scheduling of the corresponding CBG and until termination of a corresponding HARQ process).

Figure 17:
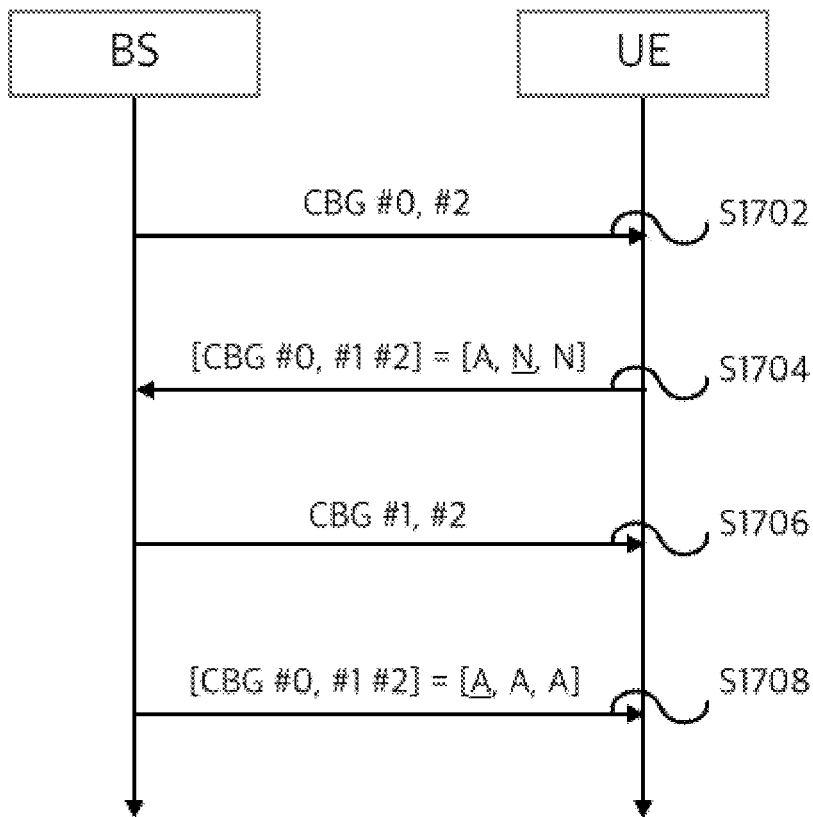

FIG. 17 exemplarily shows a signal transmitting process for the present invention. FIG. 17 assumes a situation of setting the number of CBGs per TB to 3 and (re)transmitting TB for the same HARQ process (i.e., Assume an operation before termination of an HARQ process corresponding to TB).

Referring to FIG. 17, a UE can receive CBG #0 and CBG #2 for TB (e.g., HARQ process #a) from a BS [S1702]. Here, the TB of the step S1702 may include an initial transmission or a retransmission corresponding to the HARQ process #a. Moreover, CBG #1 is assumed as never succeeding in decoding formerly. In this case, the UE transmits A/N information corresponding to 3 CBGs to the BS [S1704], sets A/N information on CBG #1 to NACK, and sets A/N information on each of CBG #0 and CBG #2 to ACK or NACK according to a decoding result. Thereafter, the BS retransmits the TB (e.g., HARQ process #a) in unit of CBG, and the UE can receive CBG #1 and CBG #2 for the corresponding TB [S1706]. In this case, the UE transmits the A/N information corresponding to the 3 CBGs to the BS [S1708], sets the A/N information on CBG #0 to ACK because of the previously successful decoding of CBG #0, and sets the A/N information on each of CBG #1 and CBG #2 to ACK or NACK according to the decoding result.

4) Method B-4: Setting a Corresponding A/N Transmission Time Delay Differently According to the Scheduled CB/CBG Number It is able to differently set a corresponding A/N transmission time delay (i.e., a time interval between a DL data reception and a corresponding A/N feedback transmission) according to the CB or CBG number simultaneously scheduled for a same TB (size). Particularly, a corresponding A/N delay may be set small if the scheduled CB or CBG number gets smaller. For example, comparing with a case that a total TB, i.e., all CBs are scheduled, a corresponding A/N delay in case of scheduling some CB or CBG may be set smaller. Moreover, assuming the same CBG size, a corresponding A/N delay in case of scheduling the smaller number of CBGs may be set smaller. Moreover, if the scheduled CBG number is identical, a corresponding A/N delay in case of configuring a smaller CBG size may be set smaller.

5) Method B-5: Setting CBG Configuration (CBG Number/Size) Between DL Data Scheduling and A/N Feedback Differently CBG configuration (e.g., CBG number/size) applied to DL data scheduling/transmission and CBG configuration applied to A/N feedback corresponding to the corresponding data reception can be set differently. Here, CBG configuration may be indicated through DL data scheduling DCI. Particularly, (M, N) combination for DL data scheduling and (M, N) combination for A/N feedback configuration may be set to different values, respectively. For example, (M1, N1) combination and (M2, N2) combination may be set for DL data scheduling and A/N feedback, respectively. Hence, Case 1 set to M1>M2 (and N1<N2) is compared with Case 2 set to M1<M2 (and N1>N2) as follows. In Case 1, the DCI bit number increases but the retransmission DL data and A/N feedback bit number may decrease. In Case 2, the DCI bit number decreases but the retransmission DL data and A/N feedback bit number may increase.

6) Method B-6: Setting an A/N Transmission Time Delay Differently Per CBG for a Plurality of Scheduled CBGs An A/N transmission time delay per CBG can be set different for a plurality of simultaneously scheduled CBGs (i.e., A/N per CBG is transmitted by TDM.) Particularly, an A/N delay corresponding to a CBG transmitted through a lower symbol (or slot) index may be set smaller. Through this, the A/N delay corresponding to the CBG transmitted through the lower symbol (or slot) index can be fed back through a relatively faster symbol (or slot) timing.

7) Method B-7: A/N Feedback Configuration Corresponding to (Re)Transmission Scheduling of TB Unit (Configured with M CBGs)

Whether to perform A/N feedback by A/N bit configuration of TB unit or A/N bit configuration of CBG unit can be indicated to a UE through semi-static signaling (e.g., RRC signaling) or dynamic signaling (e.g., (initial) DL data scheduling DCI). In case of A/N bit configuration of CBG unit, A/N payload size (and PUCCH format for the corresponding A/N transmission) can be set through semi-static signaling (e.g., RRC signaling). In this case, the total CBG number configuring TB can be determined according to a given (fixed) A/N payload size (e.g., M bits). For example, the CBG number can be determined as M equal to the A/N bit number. Hence, the CBG number configuring TB can be equally set for different TBSs, and the CB number configuring one CBG can be set different (e.g., set to a value proportional to TBS) according to TBS. Meanwhile, if the total CB number configuring TB is equal to or smaller than a given A/N payload size, a total A/N feedback can be configured in a manner of assigning A/N bit per CB without grouping of CB. On the other hand, if the total CB number 'N' is smaller than the given A/N payload size 'M' (bits), A/N bit is assigned per CB and 1) the rest (M-N) bits not assigned to A/N per CB are processed as NACK, or 2) the A/N payload size itself can be changed into N (bits) equal to the total CB number.

Meanwhile, per TBS, the CB number configuring TB and CBS configuration (e.g., the total CBG number 'M' configuring TB, the CB number 'N' configuring a single CBG) based on the CB number can be determined by the predetermined rule. Moreover, based on the CBG number set for TB, an A/N payload size and a corresponding PUCCH format can be set. For example, a PUCCH format used for CBG unit A/N transmission per TBS (total CBG number 'M' according to TBS) and a candidate PUCCH resource set can be set independently (differently). Moreover, a value of M and/or a corresponding PUCCH format can be indicated to a UE through semi-static signaling (e.g., RRC signaling) or dynamic signaling (e.g., (DL data scheduling) DCI). For example, a specific combination is indicated through DCI in a state that a plurality of (M value, PUCCH format (and candidate PUCCH resource set)) combinations are designated in advance, or an M value and a PUCCH format can be independently indicated through RRC and/or DCI. Meanwhile, once an M value is indicated, a PUCCH format (and a candidate PUCCH resource set) previously designated to the corresponding M value can be automatically determined. Or, if a PUCCH format is indicated, an M value previously designated to the corresponding PUCCH format can be automatically determined.

As another method, a value of N and/or a corresponding PUCCH format can be indicated to a UE through semi-static signaling (e.g., RRC signaling) or dynamic signaling (e.g., (DL data scheduling) DCI). For example, a specific combination is indicated through DCI in a state that a plurality of (M, PUCCH format (and candidate PUCCH resource set)) combinations are designated in advance, or an N value and a PUCCH format can be independently indicated through RRC signaling and/or DCI. Meanwhile, once an N value is indicated, a PUCCH format (and a candidate PUCCH resource set) previously designated to an M value according to the N value can be automatically determined. Or, if a PUCCH format is indicated, the total CBG number and the CB number per CBG can be automatically determined with reference to an A/N payload size (e.g., M bits) according to the PUCCH format.

8) Method B-8: A/N Feedback Configuration Corresponding to (Re)Transmission of Some CBGs (Among M CBGs Configuring TB)

In case of (re)transmission scheduling of L CBGs among total M CBGs configuring TB (where L<M), the following method can be considered.

Opt 1) It is able to apply the same A/N payload size (e.g., M bits) as the case of A/N feedback corresponding to TB-unit (re)transmission (like Method B-7). Hence, actually, A/N is mapped to L bits (corresponding to retransmission scheduled CBG) only, the rest (M-L) bits (corresponding to unscheduled CBG) are mapped to ACK or NACK according to decoding success/failure of a corresponding CBG (like Method B-3) or processed as NACK. Opt 2) It is able to apply an A/N payload size (and PUCCH format) different from (e.g., smaller than) the case of A/N feedback corresponding to TB-unit (re)transmission. In case of Opt 2, the A/N payload size (and PUCCH format) can be changed according to the scheduled CBG number 'L'. For example, A/N payload may be configured with L bits only.

Here, L may be semi-fixed to a single value through semi-static signaling (e.g., RRC signaling), or dynamically changed through dynamic signaling (e.g., DL data scheduling DCI). In the former case, CBG indication signaling can be configured to enable CBG scheduling up to max L CBGs among total M CBGs through scheduling DCI of CBG unit. Moreover, additionally, retransmission scheduling (from a BS) of L or less CBGs among total M CBGs configuring TB can be performed, where L<M. In this case, if the scheduling target CBG number exceeds L, a BS/UE can perform scheduling(DCI transmission)/A/N feedback of TB unit.

Meanwhile, Opt 1 and Opt 2 are basically applicable on the assumption that CBG configuration (e.g., total CBG number 'M' configuring TB, CB number 'N' configuring a single CBG) initially applied/indicated to TB scheduling/transmission is uniformly maintained during an HARQ process.

Additionally, in case of Opt 1, an A/N payload size (e.g., M bits) is set with reference to TB-unit (re)transmission. In order to configure A/N feedback for an actually scheduled CBG only, CBs belonging to total L scheduled CBGs (each of which is configured with N CBs) are reconfigured into M CBGs (each of which is configured with CBs less than N). With reference to this, the total A/N feedback according to A/N bit allocation of CBG unit can be configured. In this case, a BS can perform retransmission scheduling by assuming that M CBGs corresponding to A/N feedback correspond to a total CBG set. Meanwhile, in a situation that a UE corresponding to a DL data receiving end or an A/N transmitting end is accompanied by a CB regrouping process, if NACK-to-ACK error is generated, it may cause a mismatch between the UE and the BS (or, performance degradation due to the mismatch) for CBG configuration. Considering this problem, it is able to configure the total A/N feedback (payload) including an indicator (e.g., 1 bit) for the usage of indicating (a presence or non-presence of) NACK feedback of TB unit or (a presence or non-presence of) a request for retransmission of the total TB in addition as well as A/N information for each of M CBGs. Based on this, if the CBS configuration mismatch occurs, the UE can map/transmit the corresponding indicator to a state corresponding to 'TB unit NACK' or 'TB retransmission request'. Having received this, the BS can perform TB scheduling again based on initial CBG configuration previous to the regrouping.

Meanwhile, in case of the CBG retransmission scheduling DCI corresponding to the A/N feedback in Opt 2, a corresponding signaling can be configured in form of: 1) retransmission CBG indication with reference to the total CBG number 'M' irrespective of A/N payload size change; or 2) CBG indication in a state that a CBG set (equal to or smaller than M) fed back as NACK by the UE is assumed as the total CBG configuration.

Moreover, additionally, whether to apply the A/N payload size (and PUCCH format) always identical (fixed) irrespective of the scheduled CBG number like Opt 1 for CBG (retransmission) scheduling or the A/N payload size (and PUCCH format) (dynamically) changed according to the scheduled CBG number like Opt 2 can be indicated to the UE through semi-static signaling (e.g., RRC signaling) or dynamic signaling (e.g., (DL data scheduling) DCI).

9) Method B-9: A/N Feedback of CBG Unit Only if Some (of M CBGs Configuring TB) is NACK Only if the number of CBGs, which correspond to NACK, among the total M CBGs configuring TB is equal to or smaller than L (L<M), it is able to configure/transmit A/N feedback of CBG unit (e.g., allocate individual A/N bit per CBG). Meanwhile, if the CBG number of NACK exceeds L, A/N feedback of TB unit can be configured/transmitted. In this case, since the CBG-unit A/N feedback is configured for NACK equal to or smaller than L only, a corresponding signaling can be configured in a manner that retransmission CBG (index) indication through CBG-unit (retransmission) scheduling DCI is in form of: 1) indication for L or less CBGs among the total M CBGs; or 2) CBG indication in a state that CBG sets (equal to or smaller than L) fed back as NACK by the UE are assumed as total CBG configuration. For example, when i={1 . . . L}, all sets of selecting i CBGs from the total M CBGs for all i-values are indexed, and the UE can feed back one of the corresponding indexes to the BS in order to indicate a CBG set corresponding to NACK.

10) Method B-10: CBS Retransmission Scheduling and A/N Feedback in Form of Limiting the Maximum CBG Number to M In aspect of BS scheduling, a BS can operate to configure total CBG configuration with Mr CBGs (Mr≤M), and indicate retransmission of L CBGs among the Mr CBGs to a UE (L≤Mr). Here, M has a fixed value during at least one TB transmission or one HARQ process, but Mr (and L) may be changed every (retransmission) scheduling timing.

In this case, the UE can operate in A/N feedback aspect.

Opt 1) A/N feedback can be configured based on the maximum CBS number 'M' if possible. For example, the total A/N payload size is configured with M bits, and (M-L) bits corresponding to CBG failing to be scheduled actually may be processed as NACK or DTX.

Opt 2) A/N feedback can be configured based on the total CBG number 'Mr' at a scheduling timing. For example, the total A/N payload size is configured with Mr bits, and (Mr-L) bits corresponding to CBG failing to be scheduled actually may be processed as NACK or DTX.

Opt 3) A/N feedback can be configured based on the scheduled CBG number 'L'. For example, by configuring the total A/N payload size with L bits, A/N bit can be mapped/transmitted per scheduled CBG.

In case of Opt 2/3, A/N payload size can be changed according to the Mr or L value, whereby PUCCH format (and candidate PUCCH resource set) used for A/N feedback transmission can be changed.

Moreover, in this case, total Mr CBG configurations for retransmission scheduling in the BS may be configured for the total CB set configuring TB (i.e., the total CB set is equal to the total TB) or by being limited to a specific portion of the total CBs (i.e., the total CBG set corresponds to a portion of TB). In the former case, an Mr value at a specific scheduling timing for one TB transmission or one HARQ process may be limited to be set to a value always smaller than or equal to an Mr value at a previous scheduling timing. In the latter case, the specific portion of the CBs may mean: 1) a CB set belonging to L CBGs scheduled at a previous scheduling timing; or 2) a CB set belonging to CBG fed back as NACK from the UE among the L scheduled CBGs.

11) Method B-11: Processing for a (Subsequent) CB Retransmission-Scheduled Before A/N Feedback Transmission There may occur a situation that CBG retransmission (hereinafter, a subsequent CBG) for the same TB is scheduled at a timing before transmission of A/N feedback (hereinafter named first A/N) corresponding to specific TB (hereinafter named original TB) reception. In this case, it may happen that an operation of transmitting the A/N feedback, which reflects the reception combining for the subsequent CBG, through a first A/N timing may be impossible as a decoding end timing for the subsequent CBG becomes too late. Here, the reception combining may mean an operation of emptying (i.e., flushing) a received signal stored buffer and then storing the subsequent CBG. In this case, the UE may: 1) transmit A/N feedback according to a decoding result for original TB only at the first A/N timing and perform reception combining (for A/N feedback at a subsequent timing) on the subsequent CBG; or 2) transmit A/N feedback according to the decoding result reflecting the reception combining of the subsequent CBG at a timing later by a specific delay than the first A/N timing. In case of 2), the A/N transmission at the first A/N timing may be dropped or the A/N for the original TB may be transmitted only.

Meanwhile, in a UL data scheduling situation, (subsequent) CBG retransmission for the same TB may be scheduled at a timing before transmission of specific (or initial) TB in a manner similar to the above description. Here, an original TB transmission timing (hereinafter named TX timing 1) and a subsequent CBG transmission timing (hereinafter named TX timing 2) are different from each other and the Tx timing 2 may be indicated as a timing behind the TX timing 1. In this case, the UE can transmit a signal, which remains after excluding CBG corresponding to the subsequent CBG from the scheduled original TB signal (e.g., puncturing the CBG mapped RE/RB/symbol), only through TX timing 1, and also transmit the retransmission-scheduled subsequent CBG intactly through TX timing 2.

Moreover, in a situation of cross-slot scheduling for DL data, (subsequent) CBG retransmission for the same TB may be scheduled at a timing before specific (or initial) TB reception in a manner similar to the above description. Here, an original TB reception timing (hereinafter named TX timing 1) and a subsequent CBG reception timing (hereinafter named TX timing 2) are different from each other and the Tx timing 2 may be indicated as a timing behind the TX timing 1. In this case, the UE can receive a signal, which remains after excluding CBG corresponding to the subsequent CBG from the scheduled original TB signal (e.g., puncturing the CBG mapped RE/RB/symbol), only through TX timing 1, and also receive the retransmission-scheduled subsequent CBG intactly through TX timing 2.

(C) Soft Buffer Operating Method

1) Method C-1: Determining a Minimum Buffer Size Per CB with Reference to a Total Sum of the Number of CBs Belonging to CBG Corresponding to NACK It is able to consider a scheme of determining a buffer size Bc, which results from dividing a per-TB (minimum) buffer size Bt assigned to one HARQ process or one TB by a total sum Cn of CB number belonging to CBG(s) fed back as NACK (to a BS) by a UE, as a per-CB minimum buffer size in aspect of UE reception (e.g., Bc=Bt/Cn). Particularly, it is able to consider substituting C with Cn in Formula 4 as follows. Here, the per-CB minimum buffer size may mean the minimum (soft channel) bit number the UE should save to a buffer per CB for TB transmission for example.

$$n_{SB} = \min\left(N_{cb}, \left\lfloor \frac{N'_{soft}}{C_n \cdot N^{DL}_{cells} \cdot K_{MIMO} \cdot \min(M_{DL\_HARQ}, M_{limit})} \right\rfloor\right)$$ Formula 5

In this case, comparing with an existing scheme based on A/N feedback of TB unit, the per-CB minimum buffer size can be increased advantageously (e.g., because C>Cn). Moreover, Cn applied to one HARQ process or one TB transmission can be determined: 1) with reference to initial A/N feedback (CBG of NACK therein) configured by CBG unit only (i.e., Cn is uniformly applied until HARQ process termination); or 2) with reference to A/N feedback (CBG of NACK therein) at each of A/N transmission timings (i.e., Cn is determined according to NACK CBG at each scheduling/feedback timing).

Meanwhile, it is able to consider a scheme of applying Cn (i.e., total sum of the number of CBs belonging to CBG(s) fed back as NACK in BS aspect or requiring retransmission (or, failing to receive ACK feedback)) of Method C-2 to Formula 5.

2) Method C-2: (Limited/Circular Buffer) Rate-Matching Operation in a BS for Retransmission CBG Signal When (limited/circular buffer) rate matching is performed with reference to all CBGs, which are fed back as NACK (from a UE) in BS aspect or require retransmission, a mismatch between NACK CBG in BS aspect and NACK CBG fed back by the UE may be generated due to A/N error. To remove such mismatch, the following operations can be considered.

1) A BS may operate to always perform retransmission scheduling collectively/simultaneously on all CBGs fed back as NACK (from a UE) (or failing to receive ACK feedback) (i.e., retransmission scheduling is not allowed for some NACK CBGs only) (The UE operates in a state of assuming/regarding this), or 2) (Although the BS allows an operation of performing retransmission scheduling on some of total NACK CBGs,) it is able to consider an operation of indicating total CBG information (e.g., NACK CBG number/index) fed back as NACK in aspect of the BS or requiring retransmission (or, failing to receive ACK feedback) to the UE through DL data scheduling DCI.

In this case, it is able to determine a buffer size Bc, which results from dividing a per-TB (minimum) buffer size Bt assigned to one HARQ process or one TB by a total sum Cn of the CB number belonging to CBG(s) fed back as NACK in BS aspect or requiring retransmission (or failing to receive ACK feedback), as a per-CB minimum buffer size in aspect of BS transmission (e.g., Bc=Bt/Cn). Particularly, it is able to consider substituting C with Cn in Formula 2 as follows.

$$N_{cb} = \min\left(\left\lfloor \frac{N_{IR}}{C_n} \right\rfloor, K_w\right)$$ Formula 6

In this case, comparing with an existing scheme of applying TB-unit retransmission only, the per-CB minimum buffer size can be increased advantageously (e.g., because C>Cn). Cn applied to one TB transmission can be determined: 1) with reference to an initially performed CBG unit retransmission timing (i.e., Cn is uniformly applied until HARQ process termination); or 2) each CBG unit retransmission timing (i.e., Cn is determined according to the CBS number fed back as NACK with reference to each timing or requiring retransmission (or, failing to received ACK feedback).

Meanwhile, through data scheduling DCI, if indication information on a (re)transmitted CBS index and per-CBG buffer flush indication information are signaled, signaling of the buffer flush indication information may not be necessary for a CBS index having no (re)transmission indication. Here, the buffer flush information may include indication information indicating whether to empty a corresponding buffer by flush before saving a received CBG signal to the buffer or combine the received CBG signal with a previously saved CBG signal without emptying the buffer. If it is indicated to empty the buffer by flush for the CB index having no (re)transmission indication (or, indicated to combine without emptying the buffer to the contrary), a UE can operate in a state that the corresponding CBS index is regarded/assumed as an ACK feedback received CBG in BS aspect or a retransmission-not-required CBG. On the contrary, if it is indicated to combine without emptying the buffer (or, indicated to empty the buffer by flush), the UE may not perform any operation on the corresponding CBG index (a receiving (Rx) buffer corresponding thereto).

3) Method C-3: Applying Power Offset to A/N Feedback PUCCH Transmission According to Scheduling of CBG Unit Power offset added/applied to PUCCH transmission for carrying A/N feedback configured by CBG unit can be determined as a value proportional to a value of Opt 1/2/3/4/5/6/7. Hence, as the CBG number is incremented in Opt 1/2/3/4/5/6/7, the corresponding power offset can be added/applied as a larger value.

Opt 1) Total CBG number having A/N bit allocated thereto or becoming A/N feedback target (without A/N discrimination)

Opt 2) The CBG number scheduled from BS

Opt 3) The NACK CBG number indicated from BS (at BS) in Method C-2

Opt 4) The NACK CBG number at UE

Opt 5) In consideration of the A/N feedback configuration scheme like Method B-3, total sum of the CBG number of Opt 2 and the CBG number fed back as ACK despite being unscheduled Opt 6) Total sum of the CBG number of Opt 3 and the CBG number fed back as ACK despite being unscheduled Opt 7) The number of the rest of CBGs except CBG already feeding back a power offset, which is added/applied to A/N PUCCH transmission through a specific timing, as ACK at a timing previous to the specific timing (D) Mismatch Handling Method 1) Method D-1: Mismatch between per-CBG A/N Information Fed Back by a UE and CBG Retransmission-Scheduled from a BS A mismatch between per-CBG A/N information fed back by a UE and a CBG index correspondingly retransmission-scheduled from a BS may occur (due to A/N error). For example, some CBG fed back as NACK by a UE may not be included in a CBG index scheduled from a BS or/and CBG already fed back as ACK may be possibly included therein. In this case, the UE may be configured to perform the following operations.

Opt 1) For CBG previously fed back as NACK among scheduled CBGs, an A/N result from decoding after combining is mapped.

Opt 2) For CBG previously fed back as ACK among scheduled CBGs, ACK is mapped again (in a state that combining/decoding is skipped) [cf. Method B-3].

Opt 3) For all CBGs, NACK is mapped.

Opt 4) NACK feedback of TB unit or a request for retransmission of the whole TB is performed.

Opt 5) A corresponding CBG scheduling DCI is discarded.

Meanwhile, if all CBGs previously fed back as NACK are included in the scheduled CBGs, one of Opt 1 and Opt 2 is applied. Otherwise, one of Opts 1 to 5 is applicable.

2) Method D-2: Mismatch between CRC Applied to the Whole TB and CRC Applied in Unit of CB and/or CBG Among CRC applied to the whole TB, CRC applied in unit of CB, and CRC applied in unit of CBG, Rx CRC check results (e.g., pass/fail) at a UE may appear differently. Here, if the CRC check result is 'pass', it means that a corresponding data block is successfully/correctly detected. If the CRC check result is 'fail', it means that a corresponding data block is not successfully/correctly detected.

For example, CRC check result(s) in unit of CB and/or CBG may be 'pass' all (i.e., a CB CRC based CRC check is pass) but a CRC check result of the whole TB may be 'fail' (i.e., a TB CRC based CRC check is fail). On the contrary, at least one of CRC check results in unit of CB and/or CBG is fail (i.e., a CB CRC based CRC check is fail) but a CRC check result of the whole TB may be pass (i.e., a TB CRC based CRC check is pass). In this case, the UE can apply one of Opt 3 to Opt 5 of Method D-1. Opt 3 to Opt 5 of Method D-1 are listed as follows.

Opt 3) For all CBGs, NACK is mapped.

Opt 4) NACK feedback in unit of TB or a request for retransmission of the whole TB is performed.

Opt 5) A corresponding CBG scheduling DCI can be discarded.

For another example, CB-unit CRC check results belonging to a specific CBG are all pass but a CRC check result of the whole CBG may be fail. On the contrary, despite that at least one CB-unit CRC check result belonging to a specific CBG is fail, a CRC check result of the whole specific CBG may be pass. In this case, the UE may send feedback by mapping the corresponding CBG as NACK or apply one of Opt 3 to Opt 5 of Method D-1.

(E) CBG Scheduling DCI Configuration

1) Method E-1: RV Configuration and Settings in Scheduling (DCI) of CBG Unit

Regarding an RV field in (retransmission) scheduling DCI of CBG unit, 1) one RV field is configured in the same size of an RV field of scheduling DCI of TB unit and an indicated RV value is uniformly applied to the scheduled whole CBG (here, the branch number of the RV value can be configured equal to the case of TB-unit scheduling), or 2) an individual RV field is configured per CBG but can be configured to have a size smaller than that of an RV field of TB-unit scheduling DCI (yet, the branch number of the RV value can be configured smaller than the case of the TB-unit scheduling).

2) Method E-2: Performing Retransmission Scheduling on Some of M CBGs Configuring TB It can operate to enable retransmission scheduling of maximum L CBGs among total M CBGs (L<M). Here, a single value of L can be indicated to a UE through semi-static signaling (e.g., RRC signaling). Hence, maximum L CBGs among total M CBGs can be indicated through CBG-unit scheduling DCI from a BS, and TB-unit scheduling DCI (or a flag indicating TB-unit (re)transmission scheduling in DCI) is applicable to retransmission scheduling of CBGs exceeding the L CBGs. Particularly, when i={1 . . . L}, it is able to consider a scheme of indexing all combinations of selecting i CBGs from the total M CBGs and indicating a CBG set/combination corresponding to one of the corresponding indexes to a UE through CBG retransmission scheduling DCI.

3) Method E-3: Use of NDI Field in Scheduling of CBG Unit

NDI filed can be interpreted differently according to a (re)transmission for the whole TB or a retransmission for some CBGs (among all CBGs configuring TB). For one example, an NDI bit toggled combination is recognized as scheduling for new data transmission as soon as it is indicated through DCI that all CBGs configuring TB are transmitted. Hence, a case of indicating through DCI that some of all CBGs are transmitted may be regarded as retransmission (not new data), and the NDI field can be used for another specific usage. For another example, an indicator indicating a transmission for the whole TB or a transmission for some CBGs through DCI can be signaled directly. In this case, an NDI bit toggled combination can be recognized as scheduling of new data transmission as soon as the whole TB transmission is indicated. Hence, the latter case (i.e., some CBG transmission indication) can be regarded as retransmission and the NDI field can be used for another specific usage. Meanwhile, if the NDI field is used for another specific usage, the NDI field can indicate: 1) whether to save a received CBG signal to an Rx buffer corresponding to a corresponding CBG index by combining it with a previously saved signal or to newly save a received CBG signal only by emptying the buffer by flushing a previously saved signal (i.e., CBG buffer flush indicator, CBGFI), or 2) a (re)transmitted CBG (index) (i.e., CBG transmission indicator, CBGTI).

4) Method E-4: Use of a Buffer Flush Indicator Field in Scheduling (DCI) of CBG Unit A buffer flush indicator field can be interpreted differently in case of data retransmission (without NDI toggling) or in case of new data transmission (with NDI toggling). For example, in case of data retransmission, for the original usage of a buffer flush indicator, the buffer flush indicator can be used to indicate whether to empty a buffer by flush before saving a received CBG signal (per CBG) to the buffer or to combine the received CBG signal without emptying the buffer. Meanwhile, in case of new data transmission, as a buffer flush operation is basically assumed, a buffer flush indicator can be used for another specific usage. In case of using a buffer flush indicator field for another specific usage, the buffer flush indicator field may include a bit indicating TBS and/or MCS information of scheduled data. On the contrary, TBS/MCS field includes TBS/MCS information in DCI for scheduling new data transmission, but may include a bit configuring a buffer flush indicator in DCI for scheduling data retransmission.

5) Method E-5: Use of CBGTI (and CBGFI) Field in Scheduling (DCI) of CBG Unit

Based on a value indicated through CBGTI field in DCI (or a combination of the value and another value indicated through CBGFI field), it is able to indicate a buffer flush for a specific CBG (set). First of all, each bit configuring a CBGTI field can be used to individually indicate a presence or non-presence of (re)transmission for each CBG index. For example, bit '1' indicates that CBG (corresponding to the corresponding bit) is (re)transmitted, and bit '0' indicates that the corresponding CBG is not (re)transmitted. For example, bit '1' may indicate to flush a buffer (for a (re)transmission indicated CBG), and bit '0' may indicate not to flush the corresponding buffer.

First of all, in a state that CBGTI field is configured/set in DCI (without separate CBGFI field configuration) [hereinafter, CBG mode 1], all bits configuring the corresponding CBGTI field (without NDI toggling) can be indicated as '0'. In this case, provided/regarded (by UE) is indicating (re)transmission for all CBGs configuring a given TB and a buffer flush operation for all CBGs both. Hence, a UE is able to operate to save a newly received CBG signal to a buffer after flushing a signal previously saved to the buffer. Meanwhile, in CBG mode 1, all bits configuring CBGTI field (in a state that NDI is not toggled) can be indicated as '1'. In this case, provided/regarded (by UE) is indicating (re)transmission for all CBGs configuring a given TB in a state that a buffer flush operation is not indicated.

Secondly, in a state that both CBGTI field and CBGFI field are configured/set in DCI [hereinafter, CBG mode 2], all bits configuring the CBGTI field (without NDI toggling) can be indicated as '0'. In this case, provided/regarded (by UE) is indicating (re)transmission for all CBGs configuring a given TB. In this state, additionally, if CBGFI bit is indicated as '0', it can be provided/regarded (by UE) that a buffer flush operation for specific some CBGs (hereinafter, CBG sub-group 1) is indicated [Case 1]. If CBGFI bit is indicated as '1', it can be provided/regarded that a buffer flush operation for specific some other CBGs (hereinafter, CBG sub-group 2) is indicated [Case 2]. CBG(s) belonging to CBG sub-group 1 and CBG sub-group 2 can be configured totally exclusive from each other or partially identical to each other (while union of the corresponding CBGs is universal CBG set). Meanwhile, in CBG mode 2, if all bits configuring CBGTI field (in a state that NDI is not toggled) is indicated as '1' and CBGFI bit is indicated as '1' (or '0'), provided/regarded (by UE) is indicating (or not indicating) both (re)transmission for all CBGs configuring a given TB and a buffer flush operation for all CBGs.

Meanwhile, considering an early termination for a TB decoding operation in UE, 1) decoding is performed on CBs one by one in a manner of alternating per CBG for a plurality of CBGs (e.g., performing decoding in order of CB1 in CBG-1=>CB1 in CBG-2=>CB1 in CBG-M=>CB2 in CBG-1=> . . . ), or 2) decoding is performed per CBG (on index) sequentially by CBG unit (e.g., performing decoding in order of CBs in CBG-1=>CBs in CBG-2=> . . . ). If NACK CBG is generated, NACK can be fed back for all CBG (index) thereafter (by skipping a decoding operation).

Meanwhile, for DL/UL data transmitted on the basis of SPS scheme, a CBG-unit retransmission scheduling and per-CGB A/N feedback configuration operation may not be applied/configured. Hence, only for DL/UL data transmission based on general scheduling instead of the SPS scheme, a CBG-unit retransmission scheduling and per-CGB A/N feedback configuration operation can be applied/configured. And, for SPS based DL/UL data transmission, a TB-unit scheduling and per-TB (i.e., TB level) A/N feedback (e.g., configuring/transmitting 1-bit A/N for one TB) operation can be applied/configured. Moreover, for DL/UL data scheduled through UE (group) CSS based DCI (or specific DCI format, e.g., TM-common DCI format (e.g., set/used for different TM in common) similar to DCI format 0/1A in LTE) transmission (and/or Msg 3 scheduled from RAR accompanied by a random access procedure and Msg4 transmitted for the purpose of contention resolution), a CBG-unit retransmission scheduling and per-CGB A/N feedback configuration operation may not be applied/configured. Hence, for DL/UL data transmission scheduled through DCI (or TM-dedicated DCI format set/used for specific TM only) transmission based not on CSS but on USS, a CBG-unit retransmission scheduling and per-CGB A/N feedback configuration operation is applicable/configurable. On the other hand, for DL/UL data (and/or Msg3/4) transmission scheduled through CSS based DCI (or TM-common DCI format) transmission, a TB-unit retransmission scheduling and per-TB (TB level) A/N feedback operation is applicable/configurable (i.e., TB-level A/N feedback is configured).

Meanwhile, in a situation that a CBG-unit retransmission scheduling and per-CGB A/N feedback configuration operation is configured, if TB level A/N feedback is provided/generated according to the above reason (or other reasons, e.g., a UE bundles per-CBG A/Ns for A/N payload reduction, or an A/N bundling operation is indicated by a BS), an A/N scheme can be changed depending on whether A/N only for a single TB is transmitted without multiplexing [Case 1] or a plurality of A/Ns for a plurality of TBs are transmitted by being multiplexed [Case 2]. For example, in Case 1, 1-bit A/N payload is configured and the AN can be transmitted using PUCCH format/resource supportive of small payload (e.g., max 2 bits). On the other hand, in Case 2, if the per-TB CBG number is set to N, Opt 1) A/N for TB is mapped to N bits identically and repetitively, or Opt 2) A/N for TB can be mapped to 1 bit corresponding to a specific (e.g., lowest) CBG index. Meanwhile, Opt 1) and Opt 2) are applicable irrespective of Case 2 in a situation that a CBG-unit retransmission scheduling and per-CGB A/N feedback configuration operation is configured.

In Case 2, a UE can transmit A/N using PUCCH format/resource supportive of large payload (e.g., 3 bits or more) by configuring multi-bit A/N payload including N-bit A/N corresponding to a corresponding TB. The multi-bit A/N payload may include A/N information corresponding to a plurality of TBs. For example, the multi-bit A/N payload may include a plurality of N-bit A/Ns corresponding to a plurality of TBs.

Meanwhile, considering a case that an intentional URLLC puncturing operation like the above description is applied in a co-channel inter-cell environment, it may be preferable to minimize an interference effect caused by a URLLC signal transmitted in a specific cell to a DMRS signal used for DL/UL data reception in another cell at least. To this end, it is able to consider an operation of delivering/exchanging, between cells, symbol location information to use for DMRS transmission in each cell and/or symbol location information to use for URLLC (puncturing) transmission in each cell.

The proposed methods of the present invention may be non-limited to a DL data scheduling and transmission situation, and may be also applicable to a UL data scheduling and transmission situation identically/similarly (e.g., CB/CBG configuration according to TB, UL data transmission timing setting, CBG scheduling DCI configuration, etc.). With respect to this, in the proposed method of the present invention, DL data (scheduling DCI) can be substituted with UL data (scheduling DCI).

Figure 18:
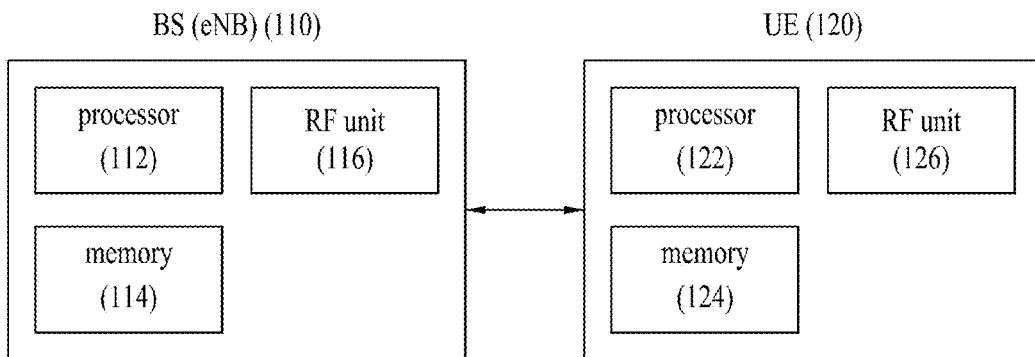
FIG. 18 exemplarily shows a base station (BS) and a user equipment (UE) applicable to embodiments of the present invention.

FIG. 18 illustrates a BS, a relay and a UE applicable to the present invention.

Referring to FIG. 18, a wireless communication system includes a BS 110 and a UE 120. When the wireless communication system includes a relay, the BS or UE may be replaced by the relay.

The BS includes a processor 112, a memory 114, an RF unit 116. The processor 112 may be configured to implement the procedures and/or methods proposed by the present invention. The memory 114 is connected to the processor 112 and stores information related to operations of the processor 112. The RF unit 116 is connected to the processor 112, transmits and/or receives an RF signal. The UE 120 includes a processor 122, a memory 124, and an RF unit 126. The processor 112 may be configured to implement the procedures and/or methods proposed by the present invention. The memory 124 is connected to the processor 122 and stores information related to operations of the processor 122. The RF unit 126 is connected to the processor 122, transmits and/or receives an RF signal.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention have been described based on data transmission and reception between a BS (or eNB) and a UE. A specific operation which has been described as being performed by the BS may be performed by an upper node of the BS as the case may be. In other words, it will be apparent that various operations performed for communication with the UE in the network which includes a plurality of network nodes along with the BS may be performed by the BS or network nodes other than the BS. The BS may be replaced with terms such as fixed station, Node B, eNode B (eNB), and access point. Also, the term UE may be replaced with terms such as UE (MS) and mobile subscriber station (MSS).

The embodiments according to the present invention may be implemented by various means, for example, hardware, firmware, software, or combinations thereof. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The present invention is applicable to a UE, BS or other devices of a wireless mobile communication system.

What is claimed is:

1. A method of transmitting code block group (CBG)-based Hybrid ARQ Acknowledgement (HARQ-ACK) information by a wireless communication device, the method comprising:
    receiving, through a radio resource control (RRC) signaling, a CBG number configuration per a single transport block (TB);
    performing a data reception for a first TB including a plurality of CBGs;
    determining respective HARQ-ACK information per each CBG of the first TB, based on a result of the data reception for the first TB; and
    transmitting, in response to the data reception, all the respective HARQ-ACK information per each CBG of the first TB,
    wherein, for M<K, where M denotes a value configured through the CBG number configuration, and K denotes a total number of code blocks (CBs) in the first TB:
        the plurality of CBGs in the first TB comprise 'mod (K, M)' CBGs each having a first number of CBs, and 'M−mod (K, M)' CBGs each having a second number of CBs, and
        the first number satisfies 'ceiling (K/M)', and the second number satisfies 'floor (K/M)'.

2. The method according to claim 1, wherein an error detection on the first TB is performed based on a cyclic redundancy check (CRC) of the first TB.

3. The method according to claim 1, wherein in a state where the wireless communication device correctly received all CBs included in a corresponding CBG of the first TB through the data reception,
    the wireless communication device determines specific HARQ-ACK information for the corresponding CBG as a negative-ACK (NACK) upon an error detection on the first TB, otherwise as an ACK.

4. The method according to claim 1, wherein a corresponding CBG is determined to be correctly received in the wireless communication device, in a state where each cyclic redundancy check (CRC) attached to each CB of the corresponding CBG has passed a CRC checking.

5. The method according to claim 1, wherein
    the wireless communication device transmits 'M' negative-ACKs (NACKs) upon an error detection on the first TB, after correctly receiving a specific CBG of the first TB as the result of the data reception.

6. The method according to claim 1, wherein the wireless communication device determines, upon an error detection on the first TB, all the respective HARQ-ACK information as all negative-ACKs (NACKs) after determining that all the CBGs of the first TB are correctly received as the result of the data reception.

7. The method according to claim 1, further comprising: performing a data re-reception for the first TB which is retransmitted entirely to the wireless communication device after transmitting all the respective HARQ-ACK information as all negative-ACKs (NACKs).

8. A non-transitory processor readable medium recorded thereon one or more program codes for executing the method of claim 1.

9. The method of claim 1, wherein a number of the plurality of CBGs included in the first TB does not exceed the value 'M'.

10. The method of claim 1, wherein the wireless communication device determines all the respective HARQ-ACK information as all negative-ACKs (NACKs) based on that the first TB is not correctly received.

11. The method of claim 1, wherein for M>K, the first TB includes K CBGs in total.

12. A device for wireless communication, the device comprising:
at least one memory configured to store one or more instructions; and
at least one processor configured to execute the one or more instructions in the at least one memory,
wherein, upon the execution of the one or more instructions, the at least one processor obtains, through a radio resource control (RRC) signaling, a CBG number configuration per a single transport block (TB); performs a data reception for a first TB including a plurality of CBGs, and determines, in response to the data reception, respective Hybrid ARQ Acknowledgement (HARQ-ACK) information per each CBG of the first TB, based on a result of the data reception for the first TB, and
wherein, for M<K, where M denotes a value configured through the CBG number configuration, and K denotes a total number of code blocks (CBs) in the first TB:
the plurality of CBGs in the first TB comprise 'mod (K, M)' CBGs each having a first number of CBs, and 'M−mod (K, M)' CBGs each having a second number of CBs, and
the first number satisfies 'ceiling (K/M)', and the second number satisfies 'floor (K/M)'.

13. The device according to claim 12, wherein the device is an application specific integrated circuit (ASIC) or a digital signal processing device.

14. The device according to claim 12, further comprising:
a transceiver; and
wherein the device is a user equipment (UE) configured to operate in a wireless communication system.

15. A method of receiving code block group (CBG)-based Hybrid ARQ Acknowledgement (HARQ-ACK) information by a wireless communication device, the method comprising:
transmitting, through a radio resource control (RRC) signaling, a CBG number configuration per a single transport block (TB);
performing a data transmission for a first TB including a plurality of CBGs;
receiving, in response to the data transmission, respective HARQ-ACK information per each CBG of the first TB,
wherein, for M<K, where M denotes a value configured through the CBG number configuration, and K denotes a total number of code blocks (CBs) in the first TB,
the plurality of CBGs in the first TB comprise 'mod (K, M)' CBGs each having a first number of CBs, and 'M−mod (K, M)' CBGs each having a second number of CBs, and
the first number satisfies 'ceiling (K/M)', and the second number satisfies 'floor (K/M)'.

16. A device for wireless communication, the device comprising:
at least one memory configured to store one or more instructions; and
at least one processor configured to execute the one or more instructions in the at least one memory,
wherein, upon the execution of the one or more instructions, the at least one processor performing a radio resource control (RRC) signaling for transmitting a CBG number configuration per a single transport block (TB), performs a data transmission for a first TB including a plurality of CBGs and obtains, in response to the data transmission, respective HARQ-ACK information per each CBG of the first TB,
wherein, for M<K, where M denotes a value configured through the CBG number configuration, and K denotes a total number of code blocks (CBs) in the first TB:
the plurality of CBGs in the first TB comprise 'mod (K, M)' CBGs each having a first number of CBs, and 'M−mod (K, M)' CBGs each having a second number of CBs, and
the first number satisfies 'ceiling (K/M)', and the second number satisfies 'floor (K/M)'.

17. The device according to claim 16, further comprising:
a transceiver; and
wherein the device is a base station (BS) configured to operate in a wireless communication system.

* * * * *